(12) United States Patent
Nash

(10) Patent No.: US 8,250,081 B2
(45) Date of Patent: Aug. 21, 2012

(54) RESOURCE ACCESS FILTERING SYSTEM AND DATABASE STRUCTURE FOR USE THEREWITH

(75) Inventor: Alistair Nash, Congleton (GB)

(73) Assignee: Websense U.K. Limited, London (GB)

( * ) Notice: Subject to any disclaimer, the term of this patent is extended or adjusted under 35 U.S.C. 154(b) by 39 days.

(21) Appl. No.: 12/523,987

(22) PCT Filed: Jan. 18, 2008

(86) PCT No.: PCT/GB2008/050036
§ 371 (c)(1), (2), (4) Date: May 6, 2010

(87) PCT Pub. No.: WO2008/090373
PCT Pub. Date: Jul. 31, 2008

(65) Prior Publication Data
US 2010/0217771 A1     Aug. 26, 2010

(30) Foreign Application Priority Data
Jan. 22, 2007 (GB) .................................. 0701158.8

(51) Int. Cl.
*G06F 17/30* (2006.01)

(52) U.S. Cl. ........ 707/754; 707/698; 707/747; 711/216; 726/2; 726/22; 726/26

(58) Field of Classification Search .............. 707/754, 707/747, 698, 999.009; 711/216; 709/201; 713/175; 726/2, 22, 26; 370/395.32
See application file for complete search history.

(56) References Cited

U.S. PATENT DOCUMENTS 4,423,414 A    12/1983   Bryant et al.

(Continued)

FOREIGN PATENT DOCUMENTS
EP     0 658 837 A2    12/1994
(Continued)

OTHER PUBLICATIONS

Abiteboul, et al., The Lorel query language for semistructured data, Int'l Journal on Digital Libraries, Apr. 1, 1997, vol. 1, Issue 1, pp. 68-88.
Chawathe, et al., Representing and querying changes in a semistructured data, Proceedings from 14th Int'l Conference, Feb. 23-27, 1998, pp. 4-13.
Dell Zhang, et al., A data model and algebra for the web, Proceedings 10th Int'l Workshop on Florence, Italy, Sep. 1-3, 1999, pp. 711-714.
European Search Report for Application No. 02255055.2, EPO, Jul. 7, 2004.

(Continued)

*Primary Examiner* — Dennis Truong
(74) *Attorney, Agent, or Firm* — Knobbe Martens Olson & Bear LLP

(57) ABSTRACT

A database structure (400) stores data representing a plurality of resource identifiers (200) such as URLs in a computing system. The URLs (200) are each associated with a respective category code (310). Each of resource identifiers (200) is hashed to provide a hash value (300) which is divided into at least first and second hash portions (301, 302). The first hash portions (301) index a main hash array (410) to select a main data block (421) in a main data section (420) holding a set of the second hash portions (302) and the respective category codes (310). For security and compactness, optionally the hash value (300) is further divided to provide a third hash portion (303) which is discarded and is not used to access the database (400). A database generation apparatus, a database search apparatus and a filtering apparatus, a method of creating a database structure and a method of retrieving data from a database structure, and to a computer readable storage medium having a database structure recorded thereon are each described.

25 Claims, 15 Drawing Sheets

U.S. PATENT DOCUMENTS

| | | | |
|---|---|---|---|
| 4,734,036 A | 3/1988 | Kasha | |
| 4,941,084 A | 7/1990 | Terada et al. | |
| 5,408,642 A | 4/1995 | Mann | |
| 5,414,833 A | 5/1995 | Hershey et al. | |
| 5,493,692 A | 2/1996 | Theimer et al. | |
| 5,541,911 A | 7/1996 | Nilakantan et al. | |
| 5,548,729 A | 8/1996 | Akiyoshi et al. | |
| 5,555,376 A | 9/1996 | Theimer et al. | |
| 5,581,703 A | 12/1996 | Baugher et al. | |
| 5,581,804 A | 12/1996 | Cameron et al. | |
| 5,586,121 A | 12/1996 | Moura et al. | |
| 5,590,403 A | 12/1996 | Cameron et al. | |
| 5,596,330 A | 1/1997 | Yokev et al. | |
| 5,606,668 A | 2/1997 | Shwed | |
| 5,648,965 A | 7/1997 | Thadani et al. | |
| 5,678,041 A | 10/1997 | Baker et al. | |
| 5,682,325 A | 10/1997 | Lightfoot et al. | |
| 5,696,486 A | 12/1997 | Poliquin et al. | |
| 5,696,898 A | 12/1997 | Baker et al. | |
| 5,699,513 A | 12/1997 | Feigen et al. | |
| 5,706,507 A | 1/1998 | Schloss | |
| 5,712,979 A | 1/1998 | Graber et al. | |
| 5,720,033 A | 2/1998 | Deo | |
| 5,724,576 A | 3/1998 | Letourneau | |
| 5,758,257 A | 5/1998 | Herz et al. | |
| 5,768,519 A | 6/1998 | Swift et al. | |
| 5,774,668 A | 6/1998 | Choquier | |
| 5,781,801 A | 7/1998 | Flanagan et al. | |
| 5,787,253 A | 7/1998 | McCreery et al. | |
| 5,787,427 A | 7/1998 | Benantar et al. | |
| 5,796,944 A | 8/1998 | Hill et al. | |
| 5,799,002 A | 8/1998 | Krishnan | |
| 5,801,747 A | 9/1998 | Bedard | |
| 5,826,014 A | 10/1998 | Coley et al. | |
| 5,828,835 A | 10/1998 | Isfeld et al. | |
| 5,832,212 A | 11/1998 | Cragun et al. | |
| 5,832,228 A | 11/1998 | Holden et al. | |
| 5,832,503 A | 11/1998 | Malik et al. | |
| 5,835,722 A | 11/1998 | Bradshaw et al. | |
| 5,835,726 A | 11/1998 | Shwed et al. | |
| 5,842,040 A | 11/1998 | Hughes et al. | |
| 5,848,233 A | 12/1998 | Radia et al. | |
| 5,848,412 A | 12/1998 | Rowland et al. | |
| 5,850,523 A | 12/1998 | Gretta, Jr. | |
| 5,855,020 A | 12/1998 | Kirsch | |
| 5,864,683 A | 1/1999 | Boebert et al. | |
| 5,884,033 A | 3/1999 | Duvall et al. | |
| 5,884,325 A | 3/1999 | Bauer et al. | |
| 5,889,958 A | 3/1999 | Willens | |
| 5,892,905 A | 4/1999 | Brandt et al. | |
| 5,893,086 A * | 4/1999 | Schmuck et al. | 1/1 |
| 5,896,502 A | 4/1999 | Shieh et al. | |
| 5,899,991 A | 5/1999 | Karch | |
| 5,899,995 A | 5/1999 | Millier et al. | |
| 5,911,043 A | 6/1999 | Duffy et al. | |
| 5,919,257 A | 7/1999 | Trostle | |
| 5,933,827 A | 8/1999 | Cole et al. | |
| 5,937,404 A | 8/1999 | Csaszar et al. | |
| 5,941,947 A | 8/1999 | Brown et al. | |
| 5,944,794 A | 8/1999 | Okamoto et al. | |
| 5,950,195 A | 9/1999 | Stockwell et al. | |
| 5,956,734 A * | 9/1999 | Schmuck et al. | 1/1 |
| 5,958,015 A | 9/1999 | Dascalu | |
| 5,961,591 A | 10/1999 | Jones et al. | |
| 5,968,176 A | 10/1999 | Nessett et al. | |
| 5,978,807 A | 11/1999 | Mano et al. | |
| 5,983,270 A | 11/1999 | Abraham et al. | |
| 5,987,606 A | 11/1999 | Cirasole et al. | |
| 5,987,611 A | 11/1999 | Freund | |
| 5,991,807 A | 11/1999 | Schmidt et al. | |
| 5,996,011 A | 11/1999 | Humes | |
| 5,999,929 A | 12/1999 | Goodman | |
| 6,012,832 A | 1/2000 | Saunders et al. | |
| 6,052,723 A | 4/2000 | Ginn | |
| 6,052,730 A | 4/2000 | Felciano et al. | |
| 6,055,564 A | 4/2000 | Phaal | |
| 6,058,389 A | 5/2000 | Chandra et al. | |
| 6,065,056 A | 5/2000 | Bradshaw et al. | |
| 6,065,059 A | 5/2000 | Shieh et al. | |
| 6,070,242 A | 5/2000 | Wong et al. | |
| 6,073,239 A | 6/2000 | Dotan | |
| 6,078,913 A | 6/2000 | Aoki et al. | |
| 6,085,241 A | 7/2000 | Otis | |
| 6,092,194 A | 7/2000 | Touboul | |
| 6,105,027 A | 8/2000 | Schneider et al. | |
| 6,154,741 A | 11/2000 | Feldman | |
| 6,173,364 B1 * | 1/2001 | Zenchelsky et al. | 711/118 |
| 6,178,419 B1 | 1/2001 | Legh-Smith et al. | |
| 6,178,505 B1 | 1/2001 | Schneider et al. | |
| 6,182,118 B1 | 1/2001 | Finney et al. | |
| 6,185,681 B1 | 2/2001 | Zizzi | |
| 6,219,667 B1 | 4/2001 | Lu et al. | |
| 6,233,618 B1 | 5/2001 | Shannon | |
| 6,233,686 B1 * | 5/2001 | Zenchelsky et al. | 726/1 |
| 6,253,188 B1 | 6/2001 | Witek et al. | |
| 6,266,664 B1 | 7/2001 | Russell-Falla et al. | |
| 6,295,559 B1 | 9/2001 | Emens et al. | |
| 6,301,658 B1 | 10/2001 | Koehler | |
| 6,338,088 B1 | 1/2002 | Waters et al. | |
| 6,357,010 B1 | 3/2002 | Viets et al. | |
| 6,377,577 B1 | 4/2002 | Bechtolsheim et al. | |
| 6,418,433 B1 | 7/2002 | Chakrabarti et al. | |
| 6,434,662 B1 * | 8/2002 | Greene et al. | 711/108 |
| 6,446,119 B1 | 9/2002 | Olah et al. | |
| 6,456,306 B1 | 9/2002 | Chin et al. | |
| 6,460,141 B1 | 10/2002 | Olden | |
| 6,466,940 B1 | 10/2002 | Mills | |
| 6,486,892 B1 | 11/2002 | Stern | |
| 6,493,758 B1 | 12/2002 | McLain | |
| 6,505,201 B1 | 1/2003 | Haitsuka et al. | |
| 6,519,571 B1 | 2/2003 | Guheen et al. | |
| 6,567,800 B1 | 5/2003 | Barrera et al. | |
| 6,571,249 B1 | 5/2003 | Garrecht et al. | |
| 6,606,659 B1 | 8/2003 | Hegli et al. | |
| 6,741,997 B1 | 5/2004 | Liu et al. | |
| 6,742,003 B2 | 5/2004 | Heckerman et al. | |
| 6,772,214 B1 | 8/2004 | McClain et al. | |
| 6,785,732 B1 | 8/2004 | Bates et al. | |
| 6,804,780 B1 | 10/2004 | Touboul | |
| 6,807,558 B1 | 10/2004 | Hassett et al. | |
| 6,832,230 B1 | 12/2004 | Zilliacus et al. | |
| 6,832,256 B1 | 12/2004 | Toga | |
| 6,839,680 B1 | 1/2005 | Liu et al. | |
| 6,894,991 B2 | 5/2005 | Ayyagari et al. | |
| 6,907,425 B1 | 6/2005 | Barrera et al. | |
| 6,947,985 B2 | 9/2005 | Hegli et al. | |
| 6,978,292 B1 | 12/2005 | Murakami et al. | |
| 6,981,281 B1 | 12/2005 | LaMacchia et al. | |
| 6,988,209 B1 | 1/2006 | Balasubramaniam et al. | |
| 7,051,200 B1 | 5/2006 | Manferdelli et al. | |
| 7,058,822 B2 | 6/2006 | Edery et al. | |
| 7,080,000 B1 | 7/2006 | Cambridge | |
| 7,089,246 B1 | 8/2006 | O'laughlen | |
| 7,093,293 B1 | 8/2006 | Smithson et al. | |
| 7,096,493 B1 | 8/2006 | Liu | |
| 7,100,199 B2 | 8/2006 | Ginter et al. | |
| 7,136,867 B1 | 11/2006 | Chatterjee et al. | |
| 7,185,015 B2 | 2/2007 | Kester et al. | |
| 7,185,361 B1 | 2/2007 | Ashoff et al. | |
| 7,197,713 B2 | 3/2007 | Stern | |
| 7,209,893 B2 | 4/2007 | Nii | |
| 7,213,069 B2 | 5/2007 | Anderson et al. | |
| 7,313,823 B2 | 12/2007 | Gao | |
| 7,359,372 B2 | 4/2008 | Pelletier et al. | |
| 7,376,154 B2 | 5/2008 | Ilnicki et al. | |
| 7,376,969 B1 | 5/2008 | Njemanze et al. | |
| 7,447,215 B2 | 11/2008 | Lynch et al. | |
| 7,487,540 B2 | 2/2009 | Shipp | |
| 7,536,437 B2 | 5/2009 | Zmolek | |
| 7,562,304 B2 | 7/2009 | Dixon et al. | |
| 7,587,488 B2 | 9/2009 | Ahlander et al. | |
| 7,603,685 B2 | 10/2009 | Knudson et al. | |
| 7,603,687 B2 | 10/2009 | Pietraszak et al. | |
| RE41,168 E | 3/2010 | Shannon | |
| 7,690,013 B1 | 3/2010 | Eldering et al. | |
| 7,895,445 B1 * | 2/2011 | Albanese et al. | 713/185 |
| 7,966,658 B2 * | 6/2011 | Singh et al. | 726/22 |

| | | | | | | |
|---|---|---|---|---|---|---|
| 7,979,895 B2 * | 7/2011 | Farrell et al. ............... 726/4 | | 2005/0210035 A1 | 9/2005 | Kester et al. |
| 2001/0032205 A1 | 10/2001 | Kubaitis | | 2005/0223001 A1 | 10/2005 | Kester et al. |
| 2001/0032258 A1 | 10/2001 | Ishida et al. | | 2005/0251862 A1 | 11/2005 | Talvitie |
| 2001/0039582 A1 | 11/2001 | McKinnon et al. | | 2005/0273858 A1 | 12/2005 | Zadok et al. |
| 2001/0047343 A1 | 11/2001 | Dahan et al. | | 2005/0283836 A1 | 12/2005 | Lalonde et al. |
| 2001/0047474 A1 | 11/2001 | Takagi | | 2006/0004636 A1 | 1/2006 | Kester et al. |
| 2002/0042821 A1 | 4/2002 | Muret et al. | | 2006/0004717 A1 * | 1/2006 | Ramarathnam et al. ......... 707/3 |
| 2002/0049883 A1 | 4/2002 | Schneider et al. | | 2006/0021031 A1 | 1/2006 | Leahy et al. |
| 2002/0062359 A1 | 5/2002 | Klopp et al. | | 2006/0026105 A1 | 2/2006 | Endoh |
| 2002/0073068 A1 | 6/2002 | Guha | | 2006/0031213 A1 * | 2/2006 | Wilson et al. ................ 707/3 |
| 2002/0073089 A1 | 6/2002 | Schwartz et al. | | 2006/0031504 A1 | 2/2006 | Hegli et al. |
| 2002/0078045 A1 | 6/2002 | Dutta | | 2006/0036874 A1 | 2/2006 | Cockerille et al. |
| 2002/0087882 A1 | 7/2002 | Schneier et al. | | 2006/0053488 A1 | 3/2006 | Sinclair et al. |
| 2002/0091947 A1 | 7/2002 | Nakamura | | 2006/0064469 A1 * | 3/2006 | Balasubrahmaniyan et al. ............... 709/218 |
| 2002/0095592 A1 | 7/2002 | Daniell et al. | | | | |
| 2002/0099952 A1 | 7/2002 | Lambert et al. | | 2006/0068755 A1 | 3/2006 | Shraim et al. |
| 2002/0110084 A1 | 8/2002 | Butt et al. | | 2006/0075072 A1 * | 4/2006 | Sinclair et al. ............... 709/219 |
| 2002/0129039 A1 | 9/2002 | Majewski et al. | | 2006/0075494 A1 | 4/2006 | Bertman et al. |
| 2002/0129140 A1 | 9/2002 | Peled et al. | | 2006/0080735 A1 | 4/2006 | Brinson et al. |
| 2002/0129277 A1 | 9/2002 | Caccavale | | 2006/0095404 A1 | 5/2006 | Adelman et al. |
| 2002/0133509 A1 | 9/2002 | Johnston et al. | | 2006/0095459 A1 | 5/2006 | Adelman et al. |
| 2002/0144129 A1 | 10/2002 | Malivanchuk et al. | | 2006/0095586 A1 | 5/2006 | Adelman et al. |
| 2002/0152284 A1 | 10/2002 | Cambray et al. | | 2006/0095965 A1 | 5/2006 | Phillips et al. |
| 2002/0174358 A1 | 11/2002 | Wolff et al. | | 2006/0101514 A1 | 5/2006 | Milener et al. |
| 2002/0178374 A1 | 11/2002 | Swimmer et al. | | 2006/0129644 A1 | 6/2006 | Owen et al. |
| 2003/0005112 A1 | 1/2003 | Krautkremer | | 2006/0168006 A1 * | 7/2006 | Shannon et al. ............... 709/206 |
| 2003/0009495 A1 * | 1/2003 | Adjaoute ............... 707/501.1 | | 2006/0191008 A1 | 8/2006 | Fernando et al. |
| 2003/0018491 A1 | 1/2003 | Nakahara et al. | | 2006/0259948 A1 | 11/2006 | Calow et al. |
| 2003/0018903 A1 | 1/2003 | Greca et al. | | 2006/0265750 A1 | 11/2006 | Huddleston |
| 2003/0023860 A1 | 1/2003 | Eatough et al. | | 2006/0288076 A1 | 12/2006 | Cowings et al. |
| 2003/0074567 A1 | 4/2003 | Charbonneau | | 2007/0005762 A1 | 1/2007 | Knox et al. |
| 2003/0088577 A1 | 5/2003 | Thurnhofer et al. | | 2007/0011739 A1 | 1/2007 | Zamir et al. |
| 2003/0093694 A1 | 5/2003 | Medvinsky et al. | | 2007/0028302 A1 | 2/2007 | Brennan et al. |
| 2003/0097617 A1 | 5/2003 | Goeller et al. | | 2007/0124388 A1 | 5/2007 | Thomas |
| 2003/0105863 A1 | 6/2003 | Hegli et al. | | 2007/0156833 A1 | 7/2007 | Nikolov et al. |
| 2003/0110168 A1 | 6/2003 | Kester et al. | | 2007/0204223 A1 | 8/2007 | Bartels et al. |
| 2003/0110272 A1 | 6/2003 | Du Castel et al. | | 2007/0260602 A1 | 11/2007 | Taylor |
| 2003/0126136 A1 | 7/2003 | Omoigui | | 2007/0299915 A1 | 12/2007 | Sharim et al. |
| 2003/0126139 A1 | 7/2003 | Lee et al. | | 2008/0086372 A1 | 4/2008 | Madhavan et al. |
| 2003/0135756 A1 | 7/2003 | Verma | | 2008/0209057 A1 * | 8/2008 | Martini et al. ............... 709/229 |
| 2003/0177187 A1 | 9/2003 | Levine et al. | | 2008/0267144 A1 | 10/2008 | Jano et al. |
| 2003/0177394 A1 | 9/2003 | Dozortsev | | 2008/0295177 A1 | 11/2008 | Dettinger et al. |
| 2003/0182420 A1 * | 9/2003 | Jones et al. ............... 709/224 | | 2009/0070872 A1 * | 3/2009 | Cowings et al. ............... 726/23 |
| 2003/0185395 A1 | 10/2003 | Lee et al. | | 2010/0005165 A1 | 1/2010 | Sinclair et al. |
| 2003/0185399 A1 | 10/2003 | Ishiguro | | 2010/0017487 A1 * | 1/2010 | Patinkin ............... 709/206 |
| 2004/0003139 A1 | 1/2004 | Cottrille et al. | | 2010/0058023 A1 * | 3/2010 | Tan ............... 711/202 |
| 2004/0003286 A1 | 1/2004 | Kaler et al. | | 2010/0064347 A1 | 3/2010 | More et al. |
| 2004/0006621 A1 | 1/2004 | Bellinson et al. | | 2011/0270852 A1 * | 11/2011 | Watanabe et al. ............... 707/754 |
| 2004/0015566 A1 | 1/2004 | Anderson et al. | | FOREIGN PATENT DOCUMENTS | | |
| 2004/0015586 A1 | 1/2004 | Hegli et al. | | | | |
| 2004/0019656 A1 | 1/2004 | Smith | | EP | 0 748 095 | 12/1996 |
| 2004/0034794 A1 | 2/2004 | Mayer et al. | | EP | 1 180 889 | 2/2002 |
| 2004/0049514 A1 | 3/2004 | Burkov | | EP | 1 278 136 | 1/2003 |
| 2004/0062106 A1 * | 4/2004 | Ramesh et al. ............... 365/202 | | EP | 1 278 330 | 1/2003 |
| 2004/0068479 A1 | 4/2004 | Wolfson et al. | | EP | 1 280 040 | 1/2003 |
| 2004/0078591 A1 | 4/2004 | Teixeira et al. | | EP | 1 318 468 | 6/2003 |
| 2004/0111499 A1 | 6/2004 | Dobrowski et al. | | EP | 1 329 117 | 7/2003 |
| 2004/0117624 A1 | 6/2004 | Brandt et al. | | EP | 1 457 885 | 9/2004 |
| 2004/0123157 A1 | 6/2004 | Alagna et al. | | EP | 1 494 409 | 1/2005 |
| 2004/0128285 A1 | 7/2004 | Green et al. | | EP | 1 510 945 | 3/2005 |
| 2004/0148524 A1 | 7/2004 | Airamo | | EP | 1 638 016 | 3/2006 |
| 2004/0153644 A1 | 8/2004 | McCorkendale | | GB | 2418330 | 3/2006 |
| 2004/0162876 A1 | 8/2004 | Kohavi | | GB | 2418999 | 4/2006 |
| 2004/0167931 A1 | 8/2004 | Han | | JP | 10 243018 | 9/1998 |
| 2004/0181788 A1 | 9/2004 | Kester et al. | | JP | 11-219363 | 8/1999 |
| 2004/0187029 A1 | 9/2004 | Ting | | JP | 2000-235540 | 8/2000 |
| 2004/0220918 A1 | 11/2004 | Scriffignano et al. | | JP | 2000 235540 A | 8/2000 |
| 2004/0220924 A1 | 11/2004 | Wootton | | WO | WO 92/19054 | 10/1992 |
| 2005/0015626 A1 | 1/2005 | Chasin | | WO | WO 96/05549 A1 | 2/1996 |
| 2005/0033967 A1 | 2/2005 | Morino et al. | | WO | WO 96/42041 | 12/1996 |
| 2005/0066197 A1 | 3/2005 | Hirata et al. | | WO | WO 98/28690 | 7/1998 |
| 2005/0091535 A1 | 4/2005 | Kavalam et al. | | WO | WO 01/24012 | 4/2001 |
| 2005/0108557 A1 | 5/2005 | Kayo et al. | | WO | WO 01/33371 | 5/2001 |
| 2005/0120229 A1 | 6/2005 | Lahti | | WO | WO 01/55873 | 8/2001 |
| 2005/0131868 A1 | 6/2005 | Lin et al. | | WO | WO 01/63835 | 8/2001 |
| 2005/0132042 A1 | 6/2005 | Cryer | | WO | WO 2005/010692 | 2/2005 |
| 2005/0132184 A1 | 6/2005 | Palliyil et al. | | WO | WO 2005/017708 | 2/2005 |
| 2005/0138353 A1 | 6/2005 | Spies | | WO | WO 2005/074213 | 8/2005 |
| 2005/0155012 A1 | 7/2005 | Tayama et al. | | WO | WO 2005/119488 | 12/2005 |

| WO | WO 2006/027590 | 3/2006 |
| WO | WO 2006/062546 | 6/2006 |
| WO | WO 2006/136605 | 12/2006 |
| WO | WO 2007/059428 A | 5/2007 |

OTHER PUBLICATIONS

Garcia-Molina et al., Database System Implementation, Department of Computer Science, Stanford University, Prentice Hall, 2000.
Goldman, R., et al., DataGuides: Enabling Query Formulation and Optimization in Semistructured Databases, Proceedings of the International Conference on Very Large Data Bases, Aug. 26, 1997, pp. 436-445.
Greenfield, P., et al., Access Prevention Techniques for Internet Content Filtering, CSIRO (XP002265027), Dec. 1999.
Nestorov, et al., Representative objects: concise representations of semistructured, hierarchical Data, Proceedings, 13th Int'l Conference in Birmingham, UK, Apr. 7-11, 1997, pp. 79-90.
Surfcontrol, Project Nomad, http:www.surfcontrol.com/news/newsitem.aspx?id=593, Oct. 29, 2003.
United Kingdom Search Report for corresponding UK Application No. GB0420023.4, Jan. 31, 2005.
United Kingdom Search Report for corresponding UK Application No. GB0420024.2, Nov. 4, 2004.
United Kingdom Search Report for corresponding UK Application No. GB0420025.9, Jan. 6, 2005.
Adam Lyon, "Free Spam Filtering Tactics Using Eudora,", May 21, 2004, pp. 1-4.
C. L. Schuba and E. H. Spafford, Countering abuse of name-based authentication, Pub: In 22nd Annual Telecommunications Policy Research Conference, 1996, pp. 21.
Cohen, F., A Cryptographic Checksum for Integrity Protection, Computers & Security, Elsevier Science Publishers, Dec. 1, 1987, vol. 6, Issue 6, pp. 505-510, Amsterdam, NL.
Dahan, M. Ed., "The Internet and government censorship: the case of the Israeli secretservice" Online information., Proceedings of the International Online Information Meeting, Oxford, Learned Infomration, GB, Dec. 12-14, 1989, vol. Meeting 13, December, Issue XP000601363, pp. 41-48, Sections 1,3., London.
European Search Report for Application No. 02258462.7, Jan. 30, 2006.
Forte, M. et al., "A content classification and filtering server for the Internet", Applied Computing 2006. 21st Annual ACM Symposium on Applied Computing, [online] http://portal.acm.org/citation.cfm?id=1141553&coll=portal&dl=ACM&CFID=2181828 &CFTOKEN=68827537> [retrieved on Dec. 9, 2007], Apr. 23, 2006-Apr. 27, 2006, pp. 1166-1171.
Gittler F., et al., The DCE Security Service, Pub: Hewlett-Packard Journal, Dec. 1995, pp. 41-48.
IBM Technical Disclosure Bulletin, Mean to Protect System from Virus, IBM Corp., Aug. 1, 1994, Issue 659-660.
Igakura, Tomohiro et al., Specific quality measurement and control of the service-oriented networking application., Technical Report of IEICE, IEICE Association, Jan. 18, 2002, vol. 101, Issue 563, pp. 51-56, Japan.
International Search Report and Written Opinion dated Jun. 30, 2008 for PCT Patent Application No. PCT/US2007/024557.
International Search Report and Written Opinion for International Application No. PCT/GB2005/003482, Dec. 9, 2005.
International Search Report and Written Opinion for PCT Application No. PCT/US2007/015730 dated Dec. 27, 2008, 16 pages.
International Search Report, International Application No. PCT/US2006/049149, Mailed Mar. 10, 2008, 4 pages.
Microsoft Press Computer Dictionary, 3rd edition, Pub: Microsoft Press, 1997, pp. 262, 276.
Molitor, Andrew, An Architecture for Advanced Packet Filtering, Proceedings for the Fifth Usenix Unix Security Symposium, Jun. 1995, pp. 1-11.
Newman, H., A Look at Some Popular Filtering Systems, Pub: Internet, Online!, Jul. 25, 1999, pp. 1-11.
PCT International Search Report and Written Opinion for International Application No. PCT/US2008/052483, Feb. 11, 2009.
Reid, Open Systems Security: Traps and Pitfalls, Computer & Security, 1995, Issue 14, pp. 496-517.
Resnick, P. et al., "PICS: Internet Access Controls Without Censorship", Communications of the Association for Comuting Machinery, ACM, Oct. 1, 1996, vol. 39, Issue 10, pp. 87-93, New York, NY.
Roberts-Witt, S., The 1999 Utility Guide: Corporate Filtering, Pub: PC Magazine Online, Apr. 5, 1999, pp. 1-11.
Sandhu, et al., Access Control: Principles and Practice, IEEE Communications Magazine, Sep. 1994, pp. 40-48.
Secure Computing Corporation, SmartFilter™ Web Tool, Dec. 1, 1998, pp. 1-2.
Sequel Technology, Inc., Sequel and Surfwatch Partner to Provide Innovative Internet Resource Management Tools for Large Enterprises, Pub: Internet, Online!, Feb. 25, 1999, pp. 1-3.
Snyder, J., A Flurry of Firewalls, www.opus1.com/www/jms/nw-firewall.html, Network World, Jan. 29, 1996, pp. 1-8.
Stein, Web Security—a step by step reference guide, Addison-Wesley, 1997, pp. 387-415.
Supplementary European Search Report for EPO App. No. 00 90 7078, May 18, 2004.
SurfControl PLC, SuperScout Web Filter Reviewer's Guide, 2002, pp. 36.
SurfWatch Software, SurfWatch® Professional Edition: Product Overview, Pub: Internet, Online!, May 26, 1999, pp. 1.
Symantec Corporation, E-security begins with sound security policies, Announcement Symantec, XP002265695, Jun. 14, 2001, pp. 1,9.
Williams, R., Data Integrity with Veracity, Retrieved from the Internet: <URL: ftp://ftp.rocksoft.com/clients/rocksoft/papers/vercty10.ps>, Sep. 12, 1994.
Wobus, J., DHCP FAQ, www.nd.edu/~milind/FAQs/FAQ_dhcp, Dec. 29, 1995, pp. 1-10.
Yialelis, et al., Role-Based Security for Distributed Object Systems, Proceedings of the IEEE Fifty Workshops on Enabling Technology: Infrastructure for Collaborative Enterprises, WET ICE '96, Jun. 19, 1996-Jun. 21, 1996, pp. 6.
Zhang et al., The Role of URLs in Objectionable Web Content Categorization, Web Intelligence, 2006.
"Google + StopBadward.org = Internet Gestapo?", http://misterpoll.wordpress.com/2007/01/05/google-stopbadwareorg-internet-gestapo/, Jan. 5, 2007.
"Trends in Badware 2007", StopBadware.org.
George, Erica, "Google launches new anti-badware API", http://blog.stopbadware.org//2007/06/19/google-launches-new-anti-badware-api, Jun. 19, 2007.
Hubbard, Dan, Websense Security Labs, The Web Vector: Exploiting Human and Browser Vulnerabilities, Toorcon 2005 (http://www.toorcon.org).
Wang et al., MBF: a Real Matrix Bloom Filter Representation Method on Dynamic Set, 2007 IFIP International Conference on Network and Parallel Computing—Workshops, Sep. 18, 2007, pp. 733-736, Piscataway, NJ, USA.
Song et al., Multi-pattern signature matching for hardware network intrusion detection systems, IEEE Globecom 2005, Jan. 23, 2006.
Deal et al., Prescription for data security, Nikkei Bite, Nikkei BP Inc., Oct. 1, 1991, vol. 91, pp. 351-369, Japan.
IronPort Web Reputation White Paper, A Comprehensive, Proactive Approach to Web-Based Threats, Ironport Systems,, 2009, pp. 10.
IronPort Web Reputation: Protect and Defend Against URL-Based Threats; Ironport Systems, Apr. 2006, 8 pages.
Ohuchi, Access control for protecting an important data from destruction and manipulation, Nikkei Computer, Nikkei Magurouhiru Inc., Feb. 3, 1986, vol. 141, pp. 75-80, Japan.
Ramesh et al., Variable-Depth Trie Index Optimization: Theory and Experimental Results, ACM, 2 Penn Plaza, Suite 701,, 1989, New York, USA.
Takizawa, Utility of a filtering tool 'Gate Guard' of Internet, Nikkei Communication, Nikkei BP Inc., Oct. 20, 1997, vol. 256, pp. 136-139, Japan.

* cited by examiner

| Main Update Section ||||||
|---|---|---|---|---|---|
| INSERT | 1st Hash Portion | 2nd Hash Portion | CC | PLI | Position |
| MODIFY | | | CC | PLI | Position |
| DELETE | 1st Hash Portion | | | | Position |

| Page Update Section |||||
|---|---|---|---|---|
| INSERT | 0 / PLI | LGTH | PGE + PCC | Position |
| MODIFY | 0 / SZE | PCC / - | | Position |
| DELETE | 0 / PLI | | | Position |

| Conflict Update Section |||||
|---|---|---|---|---|
| INSERT | Full Hash Value | Category Code | Page Level Index | Position |
| MODIFY | Category Code | | Page Level Index | Position |
| DELETE | 1st Hash Portion | | | Position |

RESOURCE ACCESS FILTERING SYSTEM AND DATABASE STRUCTURE FOR USE THEREWITH

FIELD OF THE INVENTION

The present invention relates in general to a resource access filtering system which controls access to resources of a computing network with reference to a database structure storing data representing a plurality of unique resource identifiers such as URLs. Also, the present invention relates to a generator apparatus to create such a database structure, and to a filter apparatus to control access to resources in a computing system using such a database structure. Further, the present invention relates to a method of creating a database structure and a method of retrieving data from a database structure, and to a computer readable storage medium having a database structure recorded thereon.

DESCRIPTION OF THE BACKGROUND ART

One of the great benefits of the Internet is that many millions of users have access to the shared information and communication of the World Wide Web. However, open access to all forms of information or communications is not always appropriate. For example, many schools and businesses provide Internet access for their students and employees. The school or business is, at least in part, responsible for dissemination of information within that organisation and is usually under an obligation to prevent circulation of racist, sexist or other abusive materials. This is just one example situation where there is a strong need for a measure of control over Internet access. Another example is a home environment, where parents may wish to prevent their children accessing adult-oriented web pages. Other examples include public spaces such as libraries, Internet cafes or public Internet kiosks.

Several systems are available in the related art to monitor or control access to the Internet. For example, U.S. Pat. No. 5,884,033 (Duvall et al) discloses a client-based filtering system that compares portions of incoming and/or outgoing messages to filtering information stored in a database, and determines an appropriate action, such as whether to ALLOW or BLOCK transmission of messages. An update server is accessible over the Internet for updating the database.

US2003/0088577A1 (Thurnhofer et al) discloses a method of generating a database having a relatively large number of data items classified into a relatively small number of categories, using a form of directed graphs. This database was been developed specifically for compactly and efficiently storing a large number of URLs and associated category codes. However, the database must be completely rebuilt at each revision to add new URLs or amend the categorisation.

The filtering systems and database structures of the related art encounter a variety of different demands. For example, such database structures are often required to be relatively compact so as to minimise a size of the database. However, it is also desired for the system to access the database structure at high speed. Further, it is desired to update the database at frequent intervals. Further still, it is desired to protect the security of the database. These and other problems in the related art are addressed by some of the exemplary embodiments of the invention, and will now be discussed in more detail.

SUMMARY OF THE INVENTION

According to the present invention there is provided a resource access filtering system, a generator apparatus, a filter apparatus, a method of creating a database structure, a method of retrieving data from a database structure, and a computer readable storage medium having a database structure recorded thereon, as set forth in the appended claims. Preferred features of the invention will be apparent from the dependent claims, and the description which follows.

In one aspect of the present invention there is provided a resource access filtering system, comprising a generator unit, a client unit and a filter unit. The generator unit is arranged to create a database structure and comprises at least a categorisation unit arranged to provide a plurality of resource identifiers each associated with a respective category code; a hashing unit arranged to hash each of the plurality of resource identifiers to provide a hash value and to divide the hash value into at least first and second hash portions; and a storing unit arranged to output the database structure including at least a hash array and a main data section, wherein the main data section comprises the second hash portions and the respective category codes divided amongst a plurality of main data blocks, and the hash array comprises the first hash portions each associated with a pointer to a respective one of the main data blocks in the main data section. The client unit is arranged to request access to a resource with reference to a demanded resource identifier. Suitably, the resource is a resource within a computing network, and conveniently the resource is identified by a URL including a host portion and optionally other portions such as a page portion. The filter unit is arranged to control access to the resource with reference to a category code obtained from the database structure according to the demanded resource identifier, wherein the filtering unit comprises a communication unit arranged to obtain the demanded resource identifier in relation to a resource access request made by the client device; a database access unit arranged to return a category code appropriate to the demanded resource identifier from the database structure by generating a search hash value based on the resource identifier and dividing the search hash value into at least first and second hash portions, identifying a respective main data block in the main data section of the database structure by consulting the hash array using the first hash portion, and retrieving the category code from the respective main data block according to the second hash portion; and a control unit arranged to determine a control action in relation to the resource access request made by the client device with reference to the category code obtained by the database access unit.

In one embodiment, the hashing unit is arranged to divide each of the hash values also into a third hash portion which is then discarded to improve security of the database structure. The database access unit is likewise arranged to divide the demanded resource identifier into corresponding first, second and third hash portions where only the first and second hash portions are employed to access the database structure.

In one embodiment, the storing unit is further arranged to provide a page data section and/or a conflict data section to enhance the accuracy and/or granularity of the database structure.

In one embodiment, the filter unit comprises at least a faster-access primary storage device and a slower-access secondary storage device operates in a first memory-based mode using solely the primary storage device for faster access to the database structure, or operates in a second shared-access mode where the primary storage device is used in cooperation with the secondary storage thereby reducing memory usage in the primary storage device whilst maintaining acceptable real-time access speed to the database structure.

In one embodiment, the system further comprises an updater unit arranged to produce an update structure to update the database structure. The update structure allows an incremental update of the database structure and exemplary embodiments are arranged to update the database structure whilst the database structure is still live in use.

Other aspects of the present invention relate particularly to the generator unit, the filter unit and the updater unit as separate elements of the system described herein.

A further aspect of the present invention provides a computer readable storage medium having recorded thereon a database structure storing data representing a plurality of resource identifiers each associated with a respective category code, comprising: a main data section having a plurality of main data blocks, wherein each of the plurality of main data blocks comprises a plurality of second hash portions and each of the plurality of second hash portions is associated with a respective category code; and a main hash array comprising a plurality of first hash portions, wherein each of the first hash portions is associated with a reference pointer to a respective one of the plurality of main data blocks in the main data section; wherein each of the first hash portions and the second hash portions is divided from a hash value derived a respective one of the plurality of resource identifiers.

A further aspect of the present invention provides a method of creating a database structure, comprising the computer-implemented steps of: providing a plurality of resource identifiers each associated with a respective category code; hashing each of the plurality of resource identifiers to provide a respective hash value and dividing the respective hash value into at least a first hash portion and a second hash portion; and storing at least a main hash array and a main data section in the database structure, wherein the main data section comprises a plurality of main data blocks each comprising a set of the second hash portions associated with the respective category codes, and the main hash array comprises the first hash portions each associated with a respective main data block in the data section.

A further aspect of the present invention provides a method of retrieving data from a database structure, comprising the computer-implemented steps of: receiving a demanded resource identifier which identifies a resource in a computing system; providing a hash value based on the resource identifier and dividing the hash value into at least first and second hash portions; and identifying a main data block in a main data section of the database structure by consulting a hash array using the first hash portion, and retrieving a category code from the identified main data block according to the second hash portion.

At least some embodiments of the invention may be constructed solely using dedicated hardware, and terms such as 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may, in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the preferred embodiments have been described with reference to the components, modules and units discussed below, such functional elements in alternate embodiments may be combined into fewer elements or separated into additional elements.

DESCRIPTION OF THE DRAWINGS

For a better understanding of the invention, and to show how embodiments of the same may be carried into effect, reference will now be made, by way of example, to the accompanying drawings in which:

FIG. 15 shows the exemplary update database structure in more detail concerning a main update section;

FIG. 16 shows the exemplary update database structure in more detail concerning a page update section; and FIG. 17 shows the exemplary update database structure in more detail concerning a conflict update section.

Referring to FIG. 1, a system and apparatus as employed in a first example embodiment of the present invention is applicable such as in a small-scale corporate network or a domestic home environment. In this first example embodiment, one or more client machines 10 are connected to the Internet 20 through a client gateway 12 and an Internet Service Provider (ISP) 21. Each client machine 10 provides input and output interface functions as appropriate for a human user, suitably including a display screen providing a graphical user interface (GUI), and a user input unit such as control keys, a mouse or other suitable devices. As shown in FIG. 1, in one embodiment the client machine 10 is a computing platform such as a desktop computer, a laptop computer, or a personal digital assistant (PDA). In another embodiment, the client machine 10 is a function-specific Internet appliance, such as a web-TV. In a third example, the client machine 10 is a public Internet kiosk. Many other specific forms of client machine 10 are also applicable to embodiments of the present invention.

Each of the client machines 10 provides a client application which uses URLs to obtain resources. In this example, a content server 30 is accessible via the Internet 20 and provides a resource such as a web page 32. Suitably, the client machine 10 provides a web browser application and makes a HTTP request to obtain the web page 32 from the content server 30. In this example, the web page 32 comprises text and/or graphics data in an appropriate format such as HTML, SGML, PostScript or RTF, amongst others. It will be appreciated however that the present invention is also applicable to many other resources provided in a computer system or computer network using URLs, such as file transfers under FTP, connection to a TELNET server, or Internet Relay Chat (IRC), amongst others.

The client gateway 12 suitably includes a modem or router, such as an analogue, ISDN, ADSL or SDSL modem, which connects to the ISP 21 over the plain old telephone system (POTS) or other wired or optical network to provide a network layer connection to the Internet 20. As another example, the client gateway 12 connects to the Internet 20 through a wireless network or cellular mobile network such as GSM or GPRS. In still other embodiments, the client gateway 12 connects to the Internet 20 through an intermediary such as a LAN or WAN, or optionally over a virtual private network (VPN). In one embodiment, the client machine 10 and the client gateway 12 are formed as physically separate devices and communicate by any appropriate wired or wireless link. In other embodiments, the client gateway 12 is integrated within the client machine 10.

Figure 1:
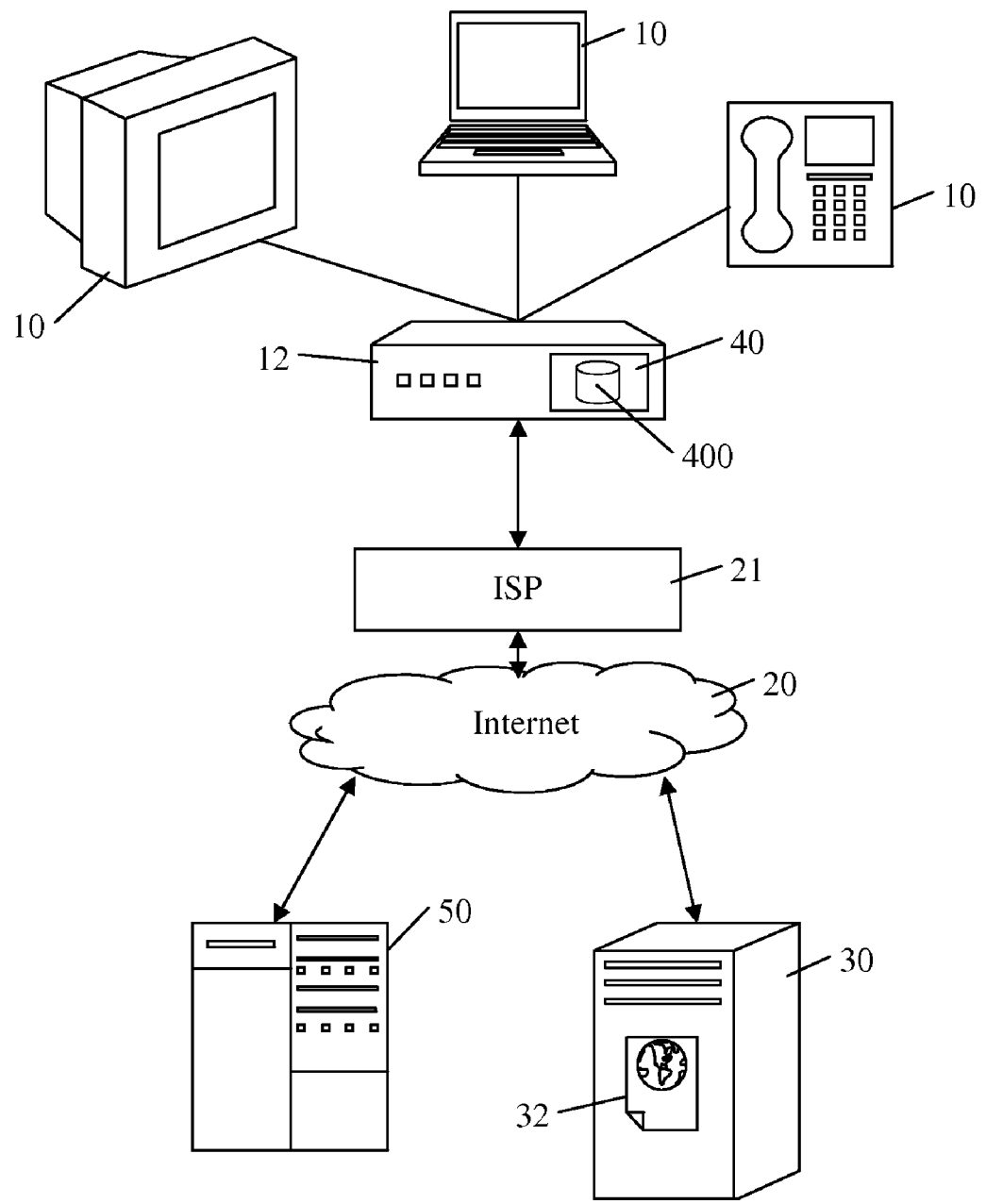
FIG. 1 is a schematic overview of a system and apparatus as employed in a first example embodiment of the present invention.

As shown in FIG. 1, a filter unit 40 is arranged to hold a database structure 400 which stores URLs and associated category codes. Conveniently, the filter unit 40 is integrated within the client gateway 12 or within one or more of the client machines 10. FIG. 1 also shows a database generator apparatus and database updater apparatus 50 which generates and updates the database structure 400. The database structure 400 is suitably provided to the filter unit 40 from a portable data storage medium such as an optical disk, or by downloading from a communication network such as over the Internet 20.

Figure 2:
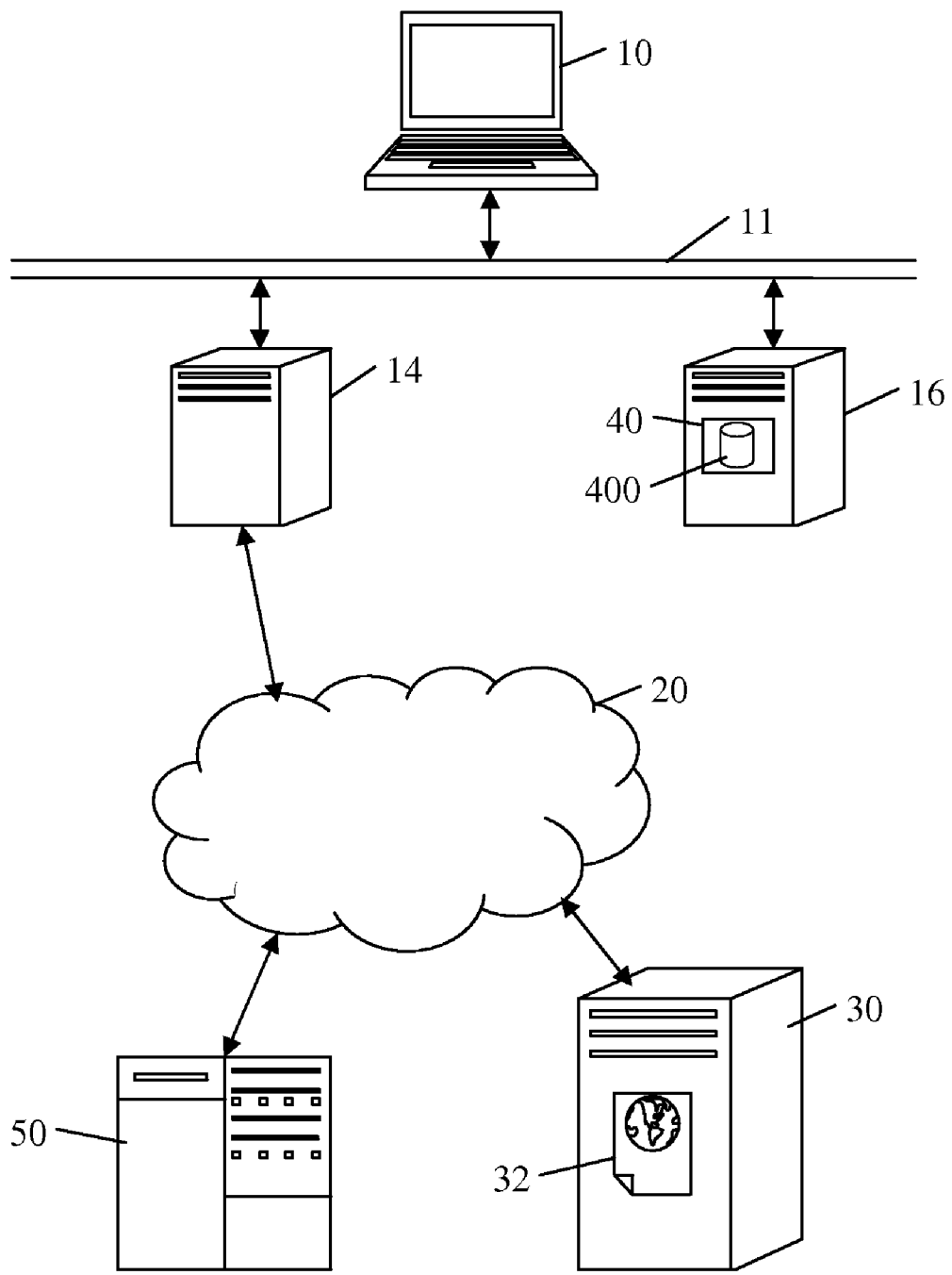
FIG. 2 is a schematic overview of a system and apparatus as employed in a second example embodiment of the present invention.

FIG. 2 is a schematic overview of a system and apparatus as employed in a second example embodiment of the present invention. The example of FIG. 2 is typical of a computing network as used in commercial offices and other large organisations. This second example provides one or more client machines 10 coupled through a local area network (LAN) 11. Typically, the LAN 11 includes one or more proxy servers 14 coupled to the Internet 20 such as through an ISP (not shown). Resources are accessed using URLs, either locally within the LAN or from outside the LAN such as over the Internet 20. A server 16 coupled to the LAN 11 provides the filter unit 40 and holds the database structure 400. As for FIG. 1 above, the database structure 400 is generated by the database generator apparatus 50 and is provided to the filter unit 40 such as over the Internet 20. The generator apparatus also acts as a database updater apparatus 50 which prepares an update package that is sent to the filter unit to update the database structure 400. There are many specific variations on the example network typography shown in FIG. 2, as will be familiar to those skilled in the art. For example, in a further embodiment, the filter unit 40, the database updater apparatus and the database structure 400 are located in the Internet cloud 20 upstream of the LAN 11 and are accessed as an on-demand managed service remote from the LAN 11.

In the example embodiments of FIGS. 1 and 2, the filter unit 40 is arranged to perform one of a variety of filtering functions, which may include passively monitoring and logging URLs for later inspection, analysis or reporting, or performing an active controlling function such as determining whether the client machine 10 will be allowed to access the requested resource. The filter unit 40 is arranged to perform such filtering functions by placing the URLs into categories, by consulting the database structure 400.

Figure 3:
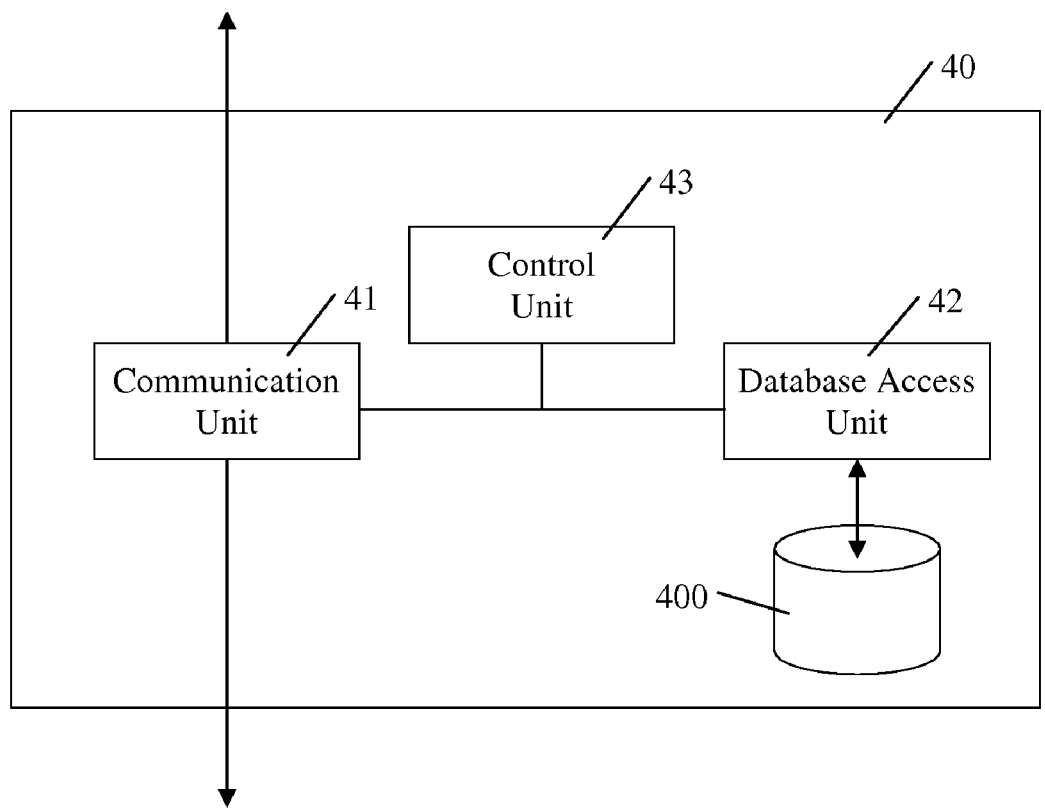
FIG. 3 is a schematic overview of a filter unit as employed in example embodiments of the invention.

FIG. 3 is a more detailed view of the filter unit 40. The filter unit 40 comprises a communication unit 41, a database access unit 42, and a control unit 43. The communication unit 41 obtains a URL in relation to a resource access request, such as by intercepting a HTTP request made by the client machine 10 to access the web page 32 on the resource server 30. Alternatively, the resource access request is intercepted elsewhere in the system and a request is made to the filter unit 40 to provide a category code for the demanded URL. The database access unit 42 interrogates the database structure 400 to determine a category of the URL. Optionally, the control unit 43 performs a filter operation with reference to the URL and the determined category code, such as an active controlling function or a passive logging function. The communication unit 41 provides an appropriate output, such as sending a HTTP reply to the client machine 10 denying access to the requested URL, or forwarding an allowable resource access request towards the resource server 30, or returning a category code relevant to the demanded URL.

In a simple example, the filter unit 40 places the URLs into one of two categories, such as either "allow" or "deny". In a more sophisticated embodiment, the URLs are categorised with greater granularity. In the present example, the database structure 400 places each URL into one of about forty categories. The example embodiment provides eight core categories such as "adult/sexual explicit", "criminal skills", "drugs, alcohol, tobacco", "violence" or "weapons", as well as thirty two productivity-related categories such as "advertisements", "games", "hobbies and recreation" or "kid's sites". Providing this predetermined set of categories allows a more sophisticated rules-based controlling or logging function to be performed. For example, a rule is used to alert an administrator when a request is made for any of the core categories, or to block selected productivity categories at particular times and allowing access only say at lunchtimes or outside work hours. To cater for all eventualities, the preferred categories may also include "don't know" or "not found" options. The specific downstream filtering actions for filtering resource access requests, such as passive monitoring functions or active blocking functions, may take any suitable form.

Figure 4:
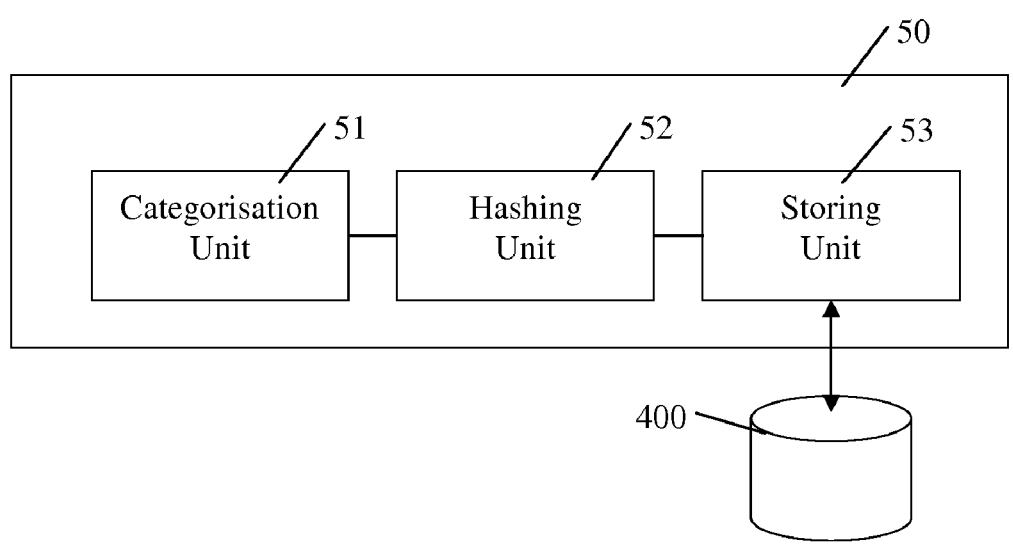
FIG. 4 is a schematic overview of a generator apparatus as employed in example embodiments of the invention.

FIG. 4 is a schematic overview of the generator apparatus 50 which generates the database structure 400. A categorisation unit 51 provides a list of URLs and associated category codes. A hashing unit 52 hashes a given URL to provide a URL hash. A storing unit 53 stores at least part of the URL hash into the database 400 along with the category code for that URL.

Figure 5:
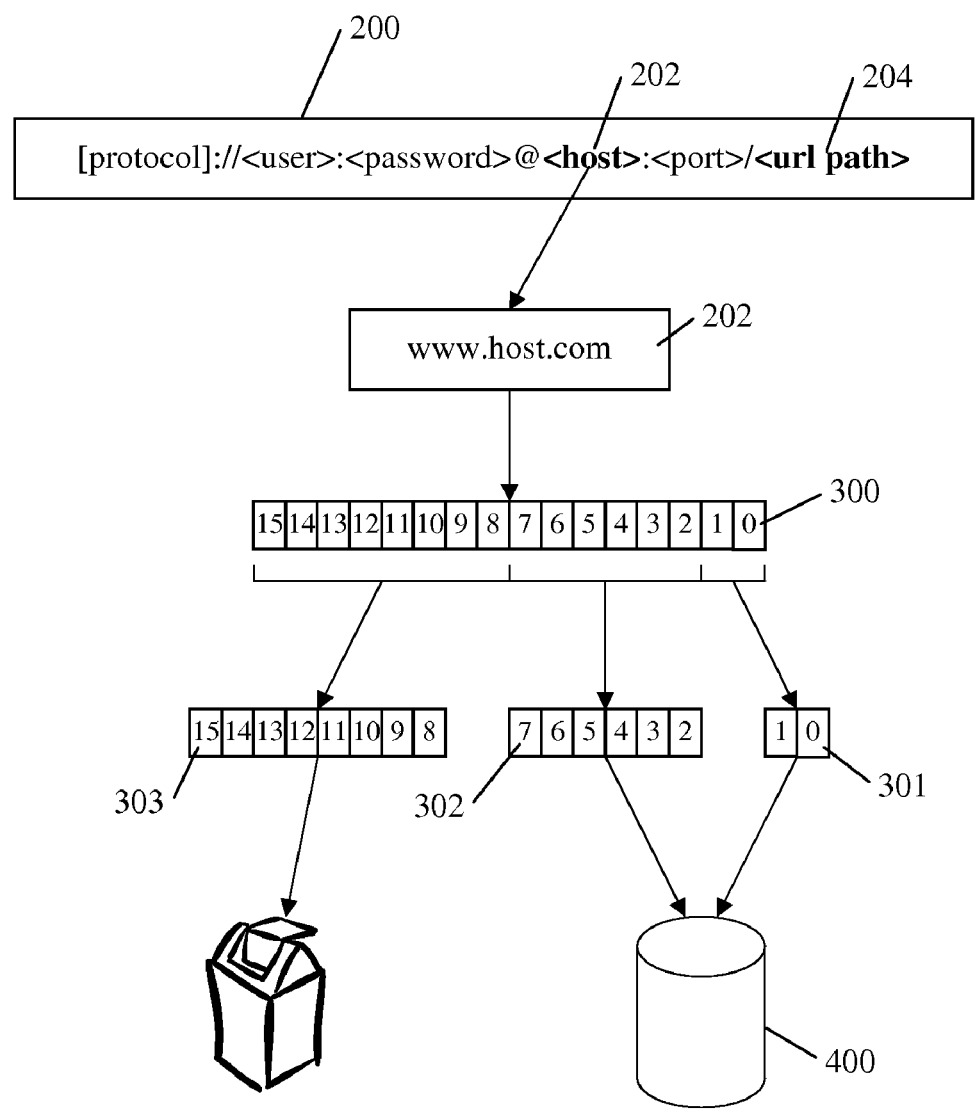
FIG. 5 shows a series of data operations which are performed by the generator apparatus of FIG. 4.

FIG. 5 shows a series of data operations which are performed by the generator apparatus 50 when generating the database structure 400.

Firstly, FIG. 5 shows a resource identifier 200 such as a Uniform Resource Identifier (URI) as defined in RFC3986. In general terms, the URI 200 is a numeric string or more commonly an alphanumeric string which is used to identify a resource within a network. The described invention is applicable in many specific environments and is applicable to many different specific forms of resource identifiers. For explanation and appreciation of the basic principles of the present invention, the example embodiments described herein are concerned with access to resources on a computer network. Most currently available computer networks are Internet Protocol (IP) based networks which employ Uniform Resource Locators (URLs) to identify resources. URLs are well known and will be familiar to the skilled person, such as from RFC1738. In FIG. 5, the example URL 200 includes a host portion 202 and a page portion 204. The host portion 202 identifies a particular host (e.g. "www.host.com"), whilst the page portion 204 identifies a relative path to a specific page (e.g. "/directory/page.html"). As another specific example, the host portion 202 may be expressed as an IPv4 address, which typically takes a four-octet dotted decimal format. As another example, the host portion 202 is an IPv6 address.

Secondly, FIG. 5 shows a URL hash value 300 which is produced by hashing the resource identifier, in this case the URL 200, with a hashing algorithm. The example embodiments employ a commonly available hashing scheme (also termed a message digest algorithm) such as MD4 or MD5. The example embodiments discussed herein use MD4, which is typically some 12% faster than MD5. Although less secure than MD5, the database structure discussed herein still allows the faster MD4 to be used securely. In the illustrated example of FIG. 4, an alphanumeric string of arbitrary length representing a URL host portion 202 is hashed using the MD4 hashing algorithm to provide a fixed-length 16-byte URL hash value 300. The length of the hash value 300 is suitably chosen according to the number of records in the database structure 400. In a larger database, the hash length is extended to, for example, 24 or 32 bytes, such that the hash 300 has a minimal probability of producing identical hash values 300 (a hash collision) for two different URL strings 200.

Thirdly, FIG. 5 shows the URL hash 300 divided into at least first and second portions 301, 302, and optionally also into a third portion 303. The first portion 301 is conveniently the least significant byte or bytes of the hash 300, such as the lowest two bytes 0 and 1 as shown in FIG. 5. The second portion 302 is conveniently a group of next most significant bytes, which in this case is the six bytes labelled 2 to 7. The third portion 303 is conveniently a group of most significant bytes, which in this case are the bytes 8 to 15. Many other divisions of the URL hash are also possible. The first and second portions 301, 302 of the URL hash 300 are retained to be applied to the database structure 400 as will be described in more detail below, whilst the third portion 303 of the URL hash 300 is discarded.

Figure 6:
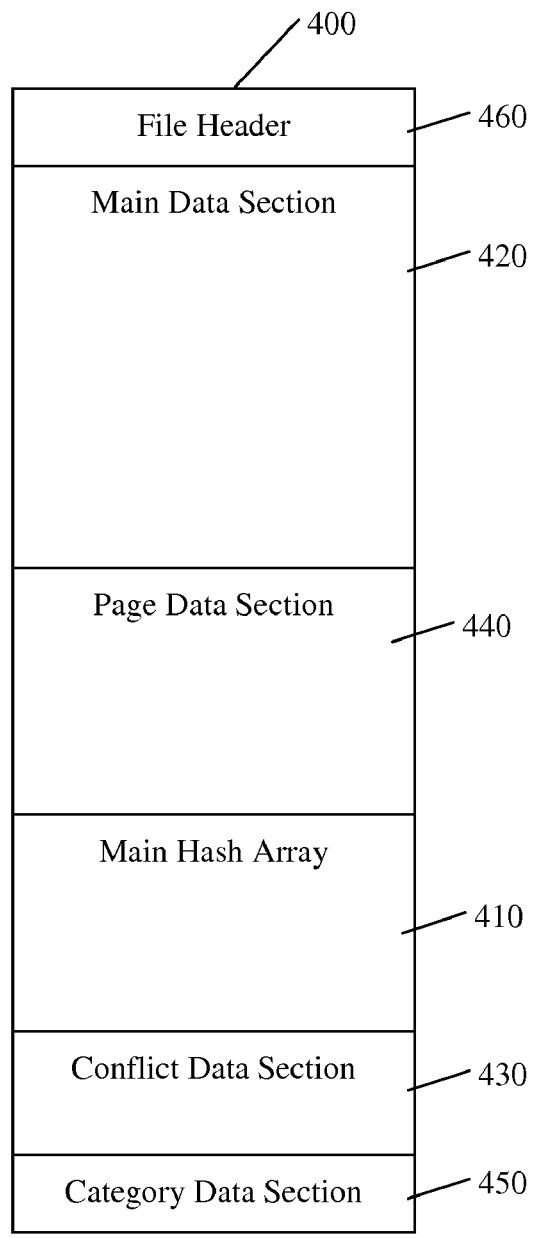
FIG. 6 is a schematic overview of an exemplary database structure as employed in embodiments of the invention.

FIG. 6 is a schematic structural overview of the database structure 400 according to an example embodiment of the present invention. The database structure 400 includes a main hash array 410 and a main data section 420, a conflict data section 430, a page data section 440, a category data section 450 and a file header 460.

Figure 7:
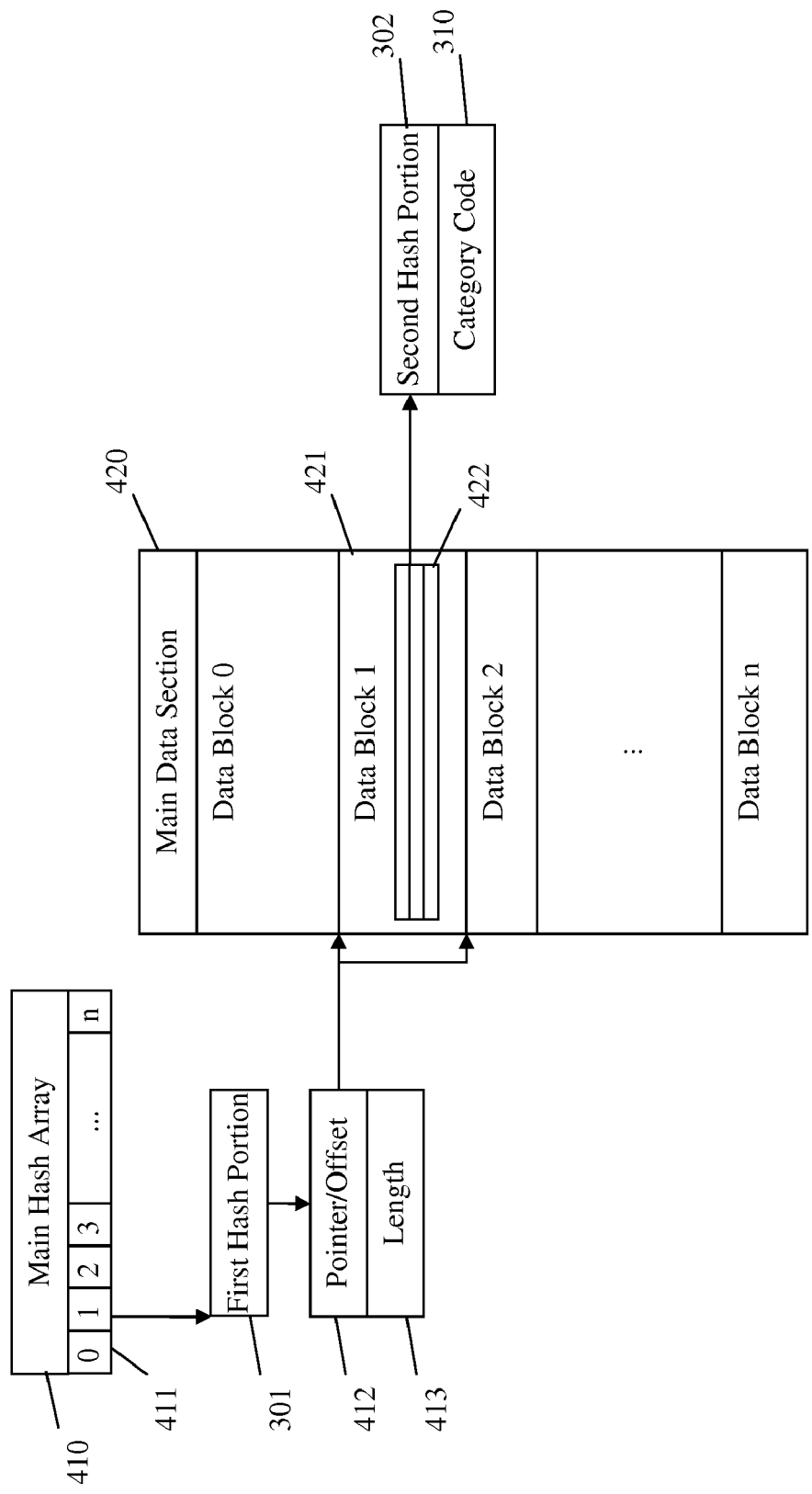
FIG. 7 shows the exemplary database structure in more detail concerning a main hash array and a main data section.

FIG. 7 shows the exemplary database structure 400 in more detail, concerning the main hash array 410 and the main data section 420. The other parts of the database will be described later.

The main hash array 410 is a hash table used to index the database structure, having entries 0 to n consistent with the first hash portion 301 of the URL hash value 300. For a 2-byte index, n is 65,536 entries. Each entry 411 in the hash table 410 identifies a block of data in the main data section 420, suitably with a pointer 412. A length value 413 gives the length of the data block. In the example embodiments, the data blocks are not all of the same size. The pointer 412 denotes an offset value (in bytes) from a start of the main data section 420. The offset 412 together with the length value 413 select a block of data 421 from the main data section 420.

Each block of data 421 in the main data section 420 stores a plurality of records 422. Each record 422 comprises a second hash portion 302 of a URL hash value 300 corresponding to a particular host portion 202 of a URL 200. Also, each record 422 comprises a corresponding category code 310 for the relevant URL. In this case, the category code 310 is a root category code which applies to the root or host portion 202 of the relevant URL 200.

Figure 8:
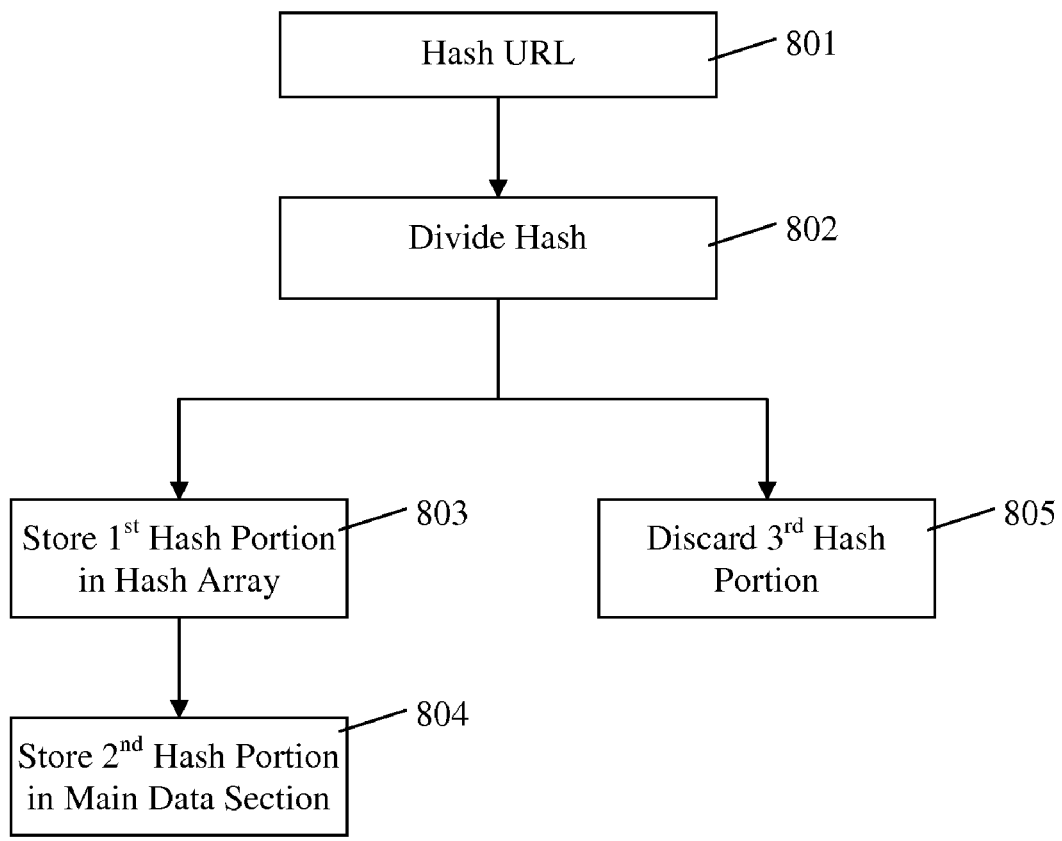
FIG. 8 is a schematic overview of a method of generating the database structure.

FIG. 8 is a schematic overview of a method of generating the database structure 400.

A URL 200 is hashed at step 801. At step 802, the URL hash is divided into at least two parts. The first part of the hash is stored in the database structure. As discussed above, a first portion 301 relates to the main hash array 410, and the second portion is stored in the relevant data block 421 of the main data section 420, at steps 803 and 804. The second part of the hash, namely the third portion 303, is discarded at step 805.

Figure 9:
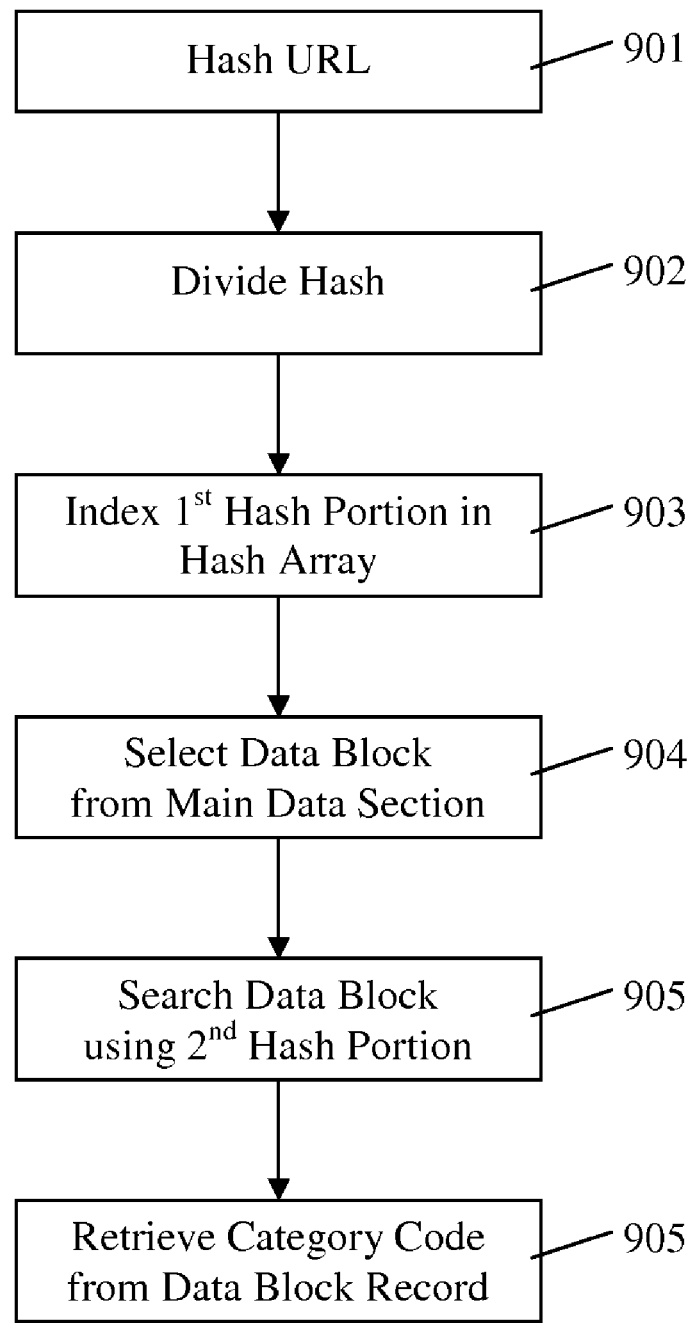
FIG. 9 shows a preferred mechanism for extracting a category code from the database structure appropriate to a demanded URL.

FIG. 9 shows a preferred mechanism for extracting a category code from the database structure appropriate to a demanded URL.

The demanded URL 200 is hashed at step 901 to provide a URL hash value 300. In particular, the host portion 202 of the URL 200 is hashed to provide the fixed-length 16-byte hash value 300. At step 902 the URL hash value is divided into the first, second and third portions 301, 302, 303. At step 903, the first URL hash portion 301, in this case the least significant two bytes, is used to index the main hash array 410, which suitably retrieves an appropriate offset 412 and length value 413. At step 904, a data block 421 is selected from the main data array 420, using the offset 412 and length 413 values. The selected data block 421 is searched at step 905 using the second hash part 802. Conveniently, the data block is numerically ordered, and the search is a binary chop or similar technique. A binary chop is a fast and simple mechanism for searching a numerically order list. Each stored second hash portion 302 is a numerical value of a known size, in this case 6 bytes. A simple integer comparison is used to search the hash values, which is much faster than an alpha-numeric string to compare full URLs 200 or URL host portions 200.

At step 906, a successful match of the second hash portion 302 in the searched data block 421 selects a particular record 422 and allows the corresponding category code 310 to be retrieved. The retrieved category code 310 is the category code appropriate to the demanded URL 200. Otherwise, a "not found" condition is returned.

Figure 10:
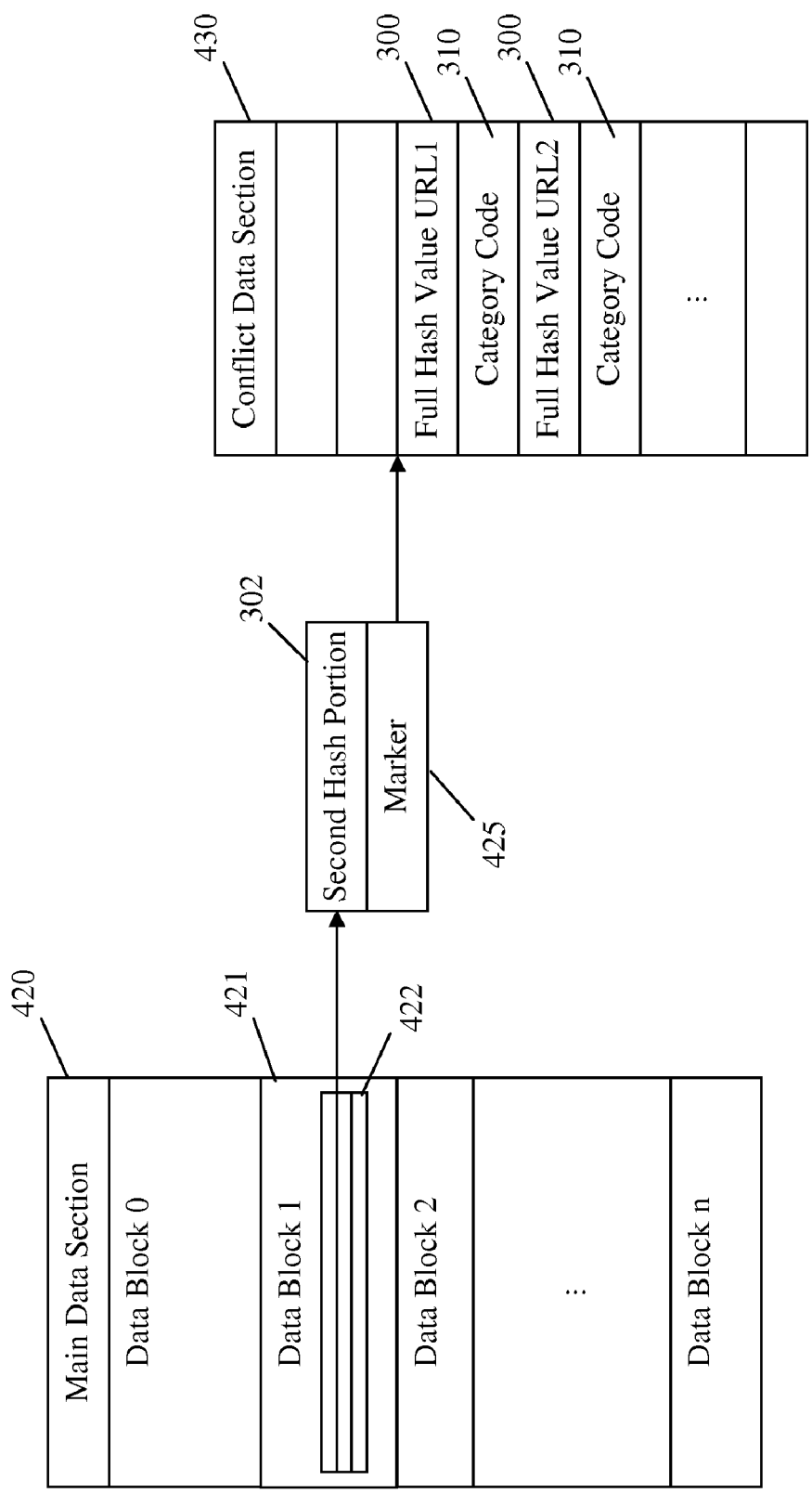
FIG. 10 shows the exemplary database structure in more detail concerning a conflict data section.

FIG. 10 shows further details of the database structure 400 relating to the conflict data section 430.

Even with the preferred 16-byte MD4 hashing algorithm, there is a small possibility that two different URLs 200 will hash to the same value. Also, since the third hash portion 303 is discarded, there is a possibility that two different URLs 200 will hash to the same partial value 301, 302 (i.e. have the same lower 8 bytes). In practice, such coincidences are very rare. However, in the event that a coincidence is detected when storing a second URL which hashes to the same value as a previously stored first URL, then the conflicted data section 430 is employed.

As shown in FIG. 10, the appropriate entry 422 in the main data section 420 is marked as invalid using a marker 425, such as by writing a predetermined value in place of the usual category code 310. The marker 425 shows that the conflict data section 430 is to be consulted.

The conflict data section 430 stores full hash values 300 for the first and second URLs. In a this example embodiment, each of the full hash values is determined under a superior hashing scheme, in this case MD5, in order to further reduce the possibility of conflicts in the full hash values. The conflict data section also stores the category code 310 for each of these URLs.

In the present scheme, it is possible that a second URL which has not been encountered previously will conflict with a stored first URL, resulting in an inaccurate category 310 being returned for the second URL. When this occurs, the database structure 400 is updated to then include the second URL, by moving both the first URL and the second URL to the conflict list 430.

Figure 11:
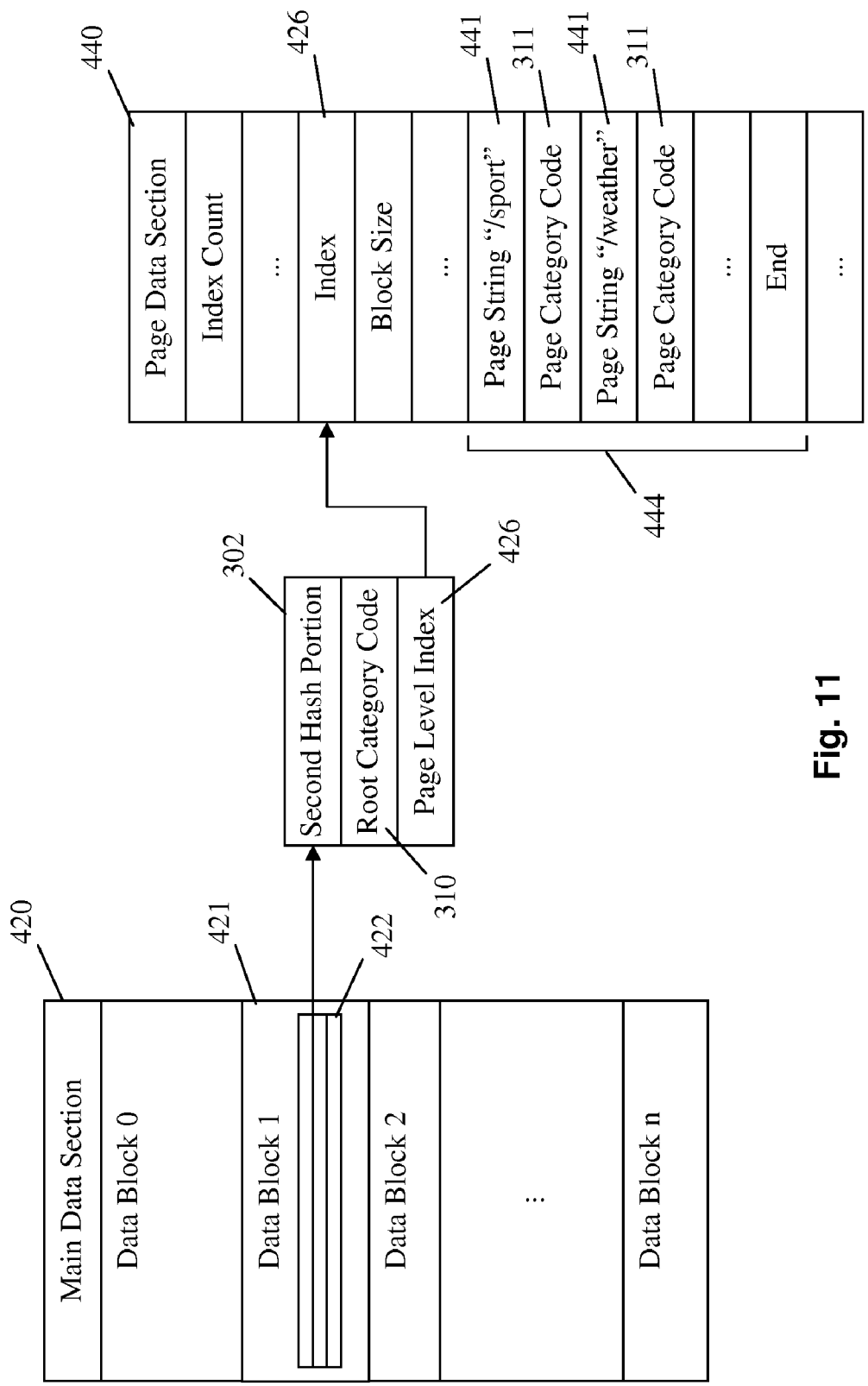
FIG. 11 shows the exemplary database structure in more detail concerning a page data section.

FIG. 11 shows further details of the example database structure 400 concerning the page data section 440.

The page data section 440 contains category codes allocated to individual pages 204 dependent from a host 202. A root category code is provided for each host 202, and optionally page category codes are provided for some or all of the pages 204 associated with a particular host 202. For example, the host domain "www.bbc.co.uk" is allocated category, e.g., "37", whilst a particular page of the domain at "www.bbc.co.uk/sport.html" is allocated another code, e.g., "38".

Referring to FIG. 11, each entry 422 in the main data section 420 further includes a page index 426 which indexes a block of page data 444 in the page data section 404. A default value (e.g. "0") is used to show that there are no pages in the page data section for a particular record 422.

In the page data section 404, the pages are grouped by index and each held as page strings 441 (e.g., "/sport", "/weather", and so on). In this example, each page string 411 has an associated page category code 311. The page strings are sorted alpha-numerically to enable a sequential search of the page data block 444. Each page block may be of any length and suitably ends with a delimiting end character (e.g. null).

Referring again to FIG. 6, the category data section 450 contains a list of category codes and related textual category names. The category data section 450 is useful in interpreting the category codes stored in the database structure. Suitably, the category data section 450 provides category names in a plurality of different languages, so that category names are displayed according to local preferences. The file header section 460 contains global information for the database structure file such as a file name. Suitably, the file header 460 identifies locations of the other data sections 410-450 in the file. Further, the file header contains validation data, such as checksums.

Figure 12:
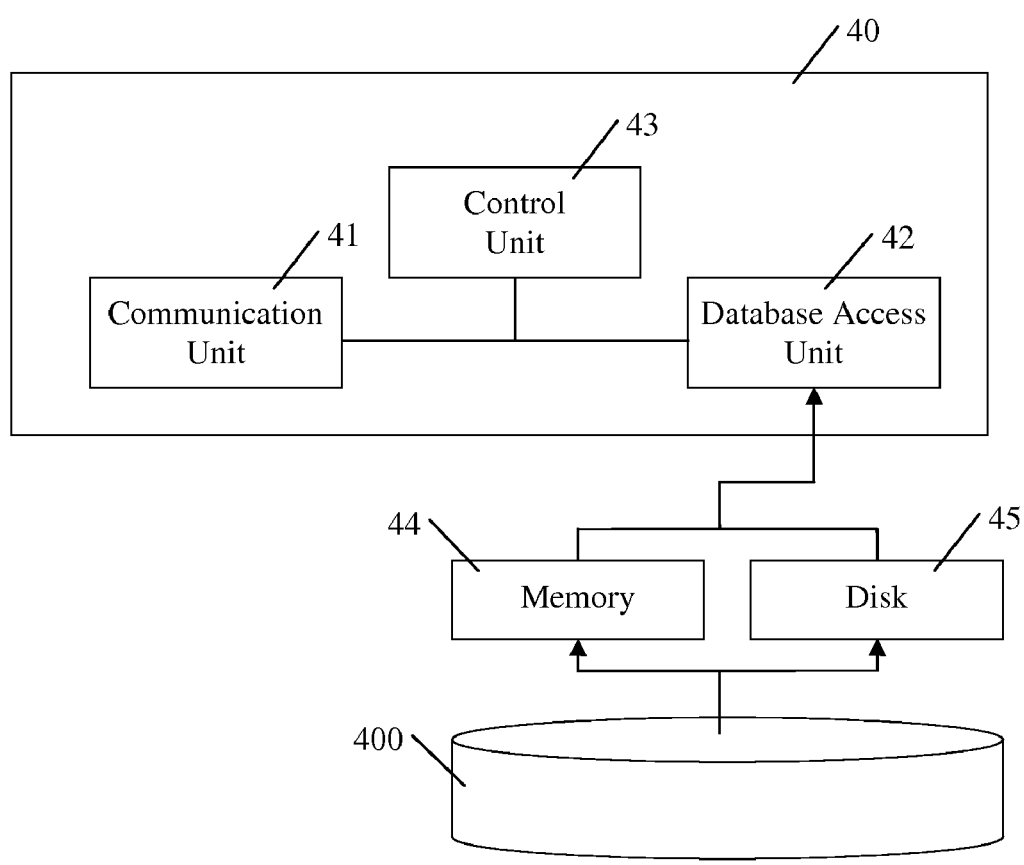
FIG. 12 shows the filter unit in more detail concerning a memory access mode and a shared access mode.

FIG. 12 shows further details of the filter unit 40 of FIG. 3 in relation to the example database structure 400 as discussed above. As shown in FIG. 12, the filter unit 40 is arranged to access at least first data storage unit 44 and a second data storage unit 45, which are able to hold the database structure 400 and provide data to the database access unit 42. Here, the data storage units 44, 45 include at least one form of fast-access primary storage device 44 such as a random-access solid-state memory, and at least one form of slow-access large-capacity long-term secondary storage device 45, such as a magnetic disk drive or optical disk storage.

In a first memory-based mode, the entire database structure 400 is loaded into the faster-access storage of the memory 44. Suitably, the database structure 400 is initialised in the memory 44 by converting each of the offsets 412 in the main hash array 410 into memory location pointers which directly or indirectly reference memory address locations where the data blocks 421 of the main data section 420 are now held. Holding the database structure entirely in the working memory 44 maximises lookup speed of the database structure 400. However, even though the database structure 400 is relatively compact, there is still a penalty in terms of the amount of memory required. In many practical situations, such as for devices with a limited memory capacity, it is desired to minimise memory area whilst maintaining adequate access times to retrieve data from the database structure. For example, equipment such as a Public Internet Kiosk or a hand held portable device (e.g. a PDA or a mobile phone) typically has relatively little free memory.

As also shown in FIG. 12, in a second shared-access mode only selected parts of the database structure 400 are loaded into the memory 44. In this shared-access mode, the main hash array 410 is loaded into the memory 44, whilst the main data section 420, the page data section 440, and the conflict data section 430 are all retained on the secondary storage 45.

At initialisation of the database structure, the offsets 412 in the main hash array 410 are converted and stored in the memory 44 as offsets from the start of the database structure file 400. The data blocks 421 are not initially loaded into the memory 44. Instead, when a lookup is performed, the converted offset 412 is obtained from the main hash array 410 in memory 44 and used to load only the required data block 421 from the main data section 420. Once the lookup is completed, the loaded data is then freed. Similarly, where the page data section 430 is employed, a page level access to the page index table 432 loads a required page data block 444 when needed. In a preferred embodiment, the page indexes 432 of the page data section 430 are also loaded into the memory 44.

This shared-access mode significantly reduces memory footprint. Further, the database structure is arranged to optimise disk-based retrieval. The offsets 412 are conveniently relative to the start of the file and placing the main data section 420 at an early part of the file helps to reduce disk seek times. Further, the main data section 420 and the page data section 440 are closely located to reduce disk head movement.

The described database structure to store URLs and associated category codes is, by its nature, a relatively large set of data. For example, the database structure may be required to hold many millions of URLs. As a practical example, the database structure contains of the order of 5.5 million main hosts 202 or IP addresses. Also, the page data section 440 lists of the order of 500,000 pages. However, example embodiments of the database structure require only about 65 Mb of storage. Hence, the described database structure 400 is less costly to transmit across a computer network, and is less costly to store.

The preferred database structure is compact, whilst maintaining speedy access. In the example memory-mode discussed above, the database structure is accessible at the order of 70,000 accesses per second with domain level categorisations. In the shared-mode, of the order of just 2 Mb of data is held in memory, with the remainder (i.e. around 63 Mb) remaining on secondary storage such as a hard disk. Only three disk read operations are required per categorisation, in order to return a category code. Most categorisations take only one or two disk reads. Root level categorisations (domain level) take only one disk read. The shared-mode in an example embodiment handles over 25,000 categorisations per second.

In many cases, the database structure needs to be updated frequently, such as in order to add new URLs and category codes, or to amend the existing data. Typically, updates are required at least once per day.

Figure 13:
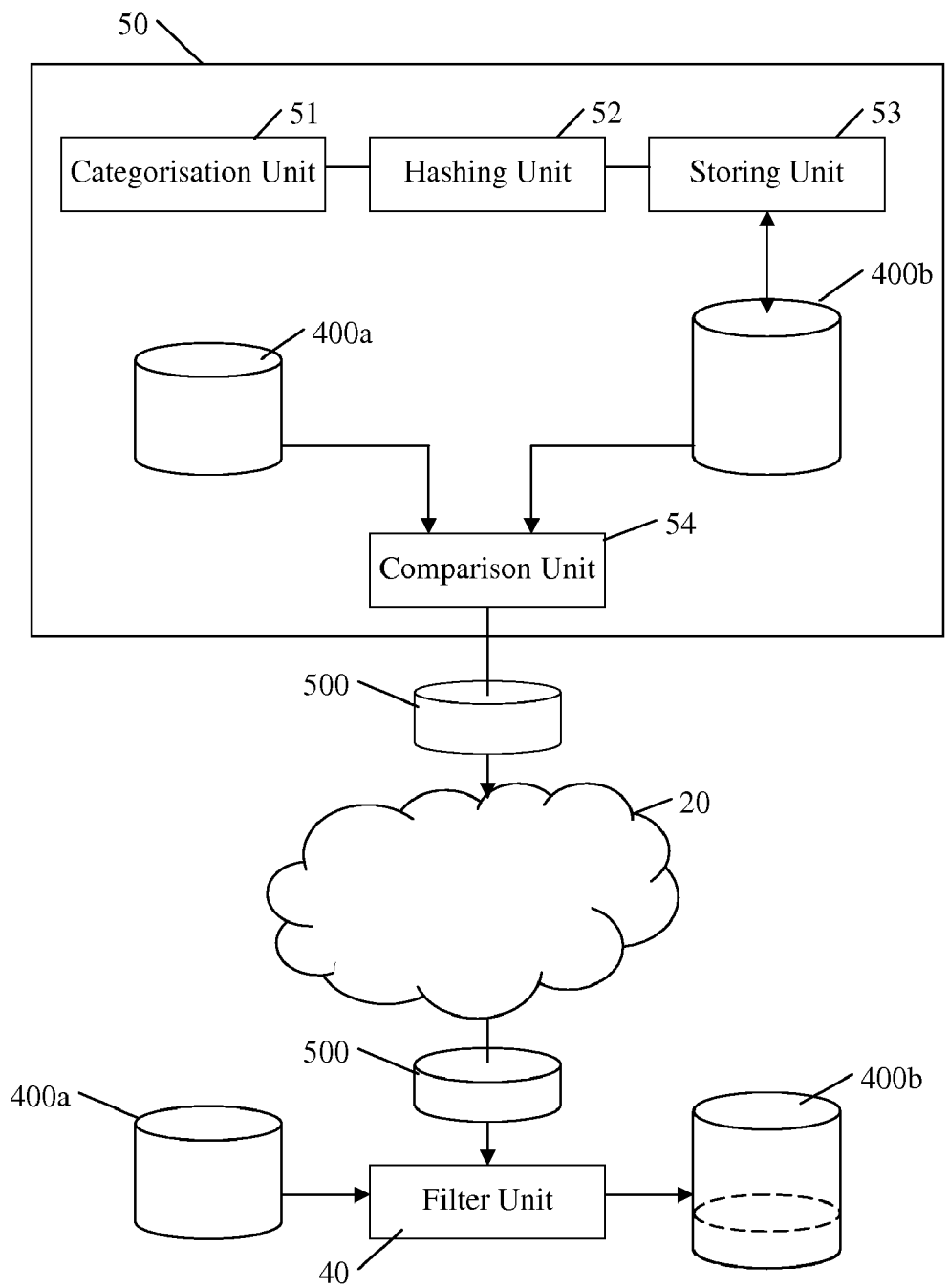
FIG. 13 is a schematic overview of a system and apparatus as employed to update the exemplary database structure.

FIG. 13 shows an example system to transmit a database update structure 500, which is employed to incrementally update the database structure 400.

The generator unit 50 includes an updater unit 54 which compares a current version of the database structure 400*a* against a required new version 400*b* to produce the update structure 500. The update structure 500 is then transmitted to the filter unit 40 over a communication network such as the Internet 20. Sending just the incremental update 500 significantly reduces bandwidth consumption in the communication network 20. Optionally, the update structure 500 is compressed to further compact its size during transmission.

The filter unit 40 applies the update structure 500 to a current copy of the database structure 400a to produce the required new database structure 400b incorporating the desired updates, as will now be explained in more detail.

Figure 14:
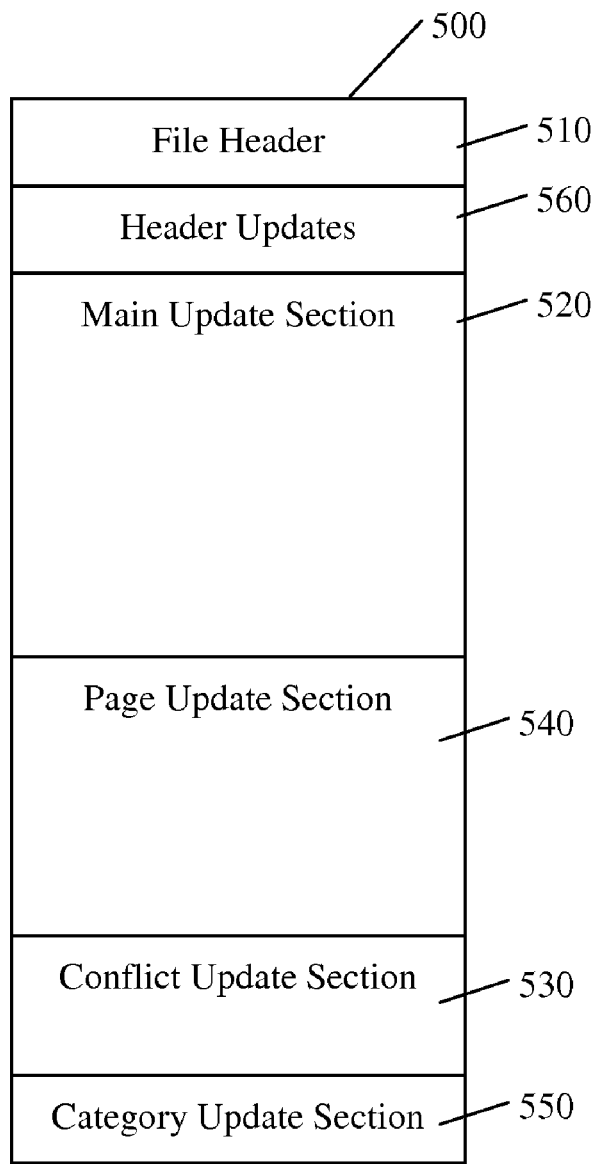
FIG. 14 is a schematic overview of an exemplary update database structure as employed in embodiments of the invention.

FIG. 14 shows a general overview of the update structure 500, including a file header 510, a header update section 560, a main update section 520, a page update section 540, a conflict update section 530 and a category update section 550.

The file header 510 contains header information relating to the update file 500 such as date, version, file size and file checksums.

The header update section 560 contains data to completely replace the header section 460 of the current database structure 400a. The header 460 contains offsets and sizes of the other sections in the structure (e.g. offset and size of the main data section 420). Sending the entire new header 460 reduces workload at the filter unit 40 by avoiding recalculation of the section offsets and sizes after the update has completed.

The category update section 550 contains a complete replacement of the category data section 460. This data changes relatively infrequently, and is retransmitted in its entirety.

FIG. 15 shows the main update section 520 in more detail. The main update section 520 contains a list of update commands 521 each followed by one or more parameters 522. The commands are suitably expressed as a predetermined code (e.g. 0x01, 0x02 and 0x03) and are used to insert, modify or delete a record 422 in the main data section 420. The commands are sorted such that the order of the commands 521 corresponds to the order of the records 422, i.e. according to the hash portions 301, 302.

An INSERT command instructs the filter unit 40 to insert a new record 422 in the main data section 420 of database structure, at a location identified by the POSITION parameter 522. The POSITION parameter 522 gives an offset position relative to a position of a previous command (or a default start position) where the instructed command is to be performed. Hence, the sequential ordering of the commands 521 allows the filter unit 40 to step through the database structure and make appropriate changes in order. The INSERT command also provides parameters 522 for second hash portion 302, the category code (CC) 310 and, if required, the page level index (PLI) 315 to complete the new record 422. The first hash portion 301 is also provided, and the main hash array 410 is recalculated by the filter unit 40 to allow for the new record 422.

A MODIFY command instructs the filter unit 40 to modify an existing record 422 in the main data section 420. In this case, the parameters 522 provide new data to be written into the database structure to replace the current data of the relevant record 422. In this example, the parameters 522 provide a new category code (CC) 310 and a new page level index (PLI) 315.

A DELETE command instructs the filter unit 40 to delete a record 422 from the main data section 420 of database structure, as identified by the POSITION parameter 522. The first hash portion 301 is also given, such that the filter unit 40 recalculates the main hash array 410 to account for the now deleted record 422.

FIG. 16 shows more detail of the page update section 540 which supports INSERT, MODIFY and DELETE commands 541 with appropriate parameters 542, similar to the main update section 520 discussed above. The page commands 541 are sorted by the first hash portion 301 and then by the page string 441.

A page INSERT command instructs the filter unit 40 to insert a new page block 444 in the page data section 440 of the database structure, or insert a new page string 441 and page category code 331 in an already existing page block 444. A first parameter 522 gives a Page Level Index (PLI) 426 when adding an entire new page block 444, or else "0" to add a page entry. A second LGTH parameter gives the length of a following third parameter (e.g. in bytes). The third parameter provides a set of page strings 441 and page category codes 311 for a new page block 434, or else gives the page string 441 and page category code 311 for the inserted page. The POSITION parameter 522 gives an offset position relative to a position of a previous command (or a default start position) where the instructed command is to be performed.

A page MODIFY command 521 instructs the filter unit 40 to modify a page block size with a SZE parameter 522, or else modify a page category code (PCC) 311 of an existing page in the page data section 440.

A page DELETE command instructs the filter unit 40 to delete a particular page string 441 and related page category code 311 from the page data section 440, as identified by the POSITION parameter 522. Alternatively, a Page Level Index 426 is given in the first parameter 522 and the DELETE command the deletes an entire page block 444.

FIG. 17 shows more detail of the conflict update section 530 which supports conflict INSERT, MODIFY and DELETE commands 531 with appropriate parameters 532, similar to the main update section 520 and the page update section 540 discussed above. The conflict commands 531 are sorted by the full hash value 300.

A conflict INSERT command instructs the filter unit 40 to insert a new full hash value 300 in the conflict data section 430 with the category code 300. The page level index 426 is provided where the relevant root URL links to page level data. The POSITION parameter 522 gives an offset position relative to a position of a previous command (or a default start position) where the instructed command is to be performed. A conflict MODIFY command 521 instructs the filter unit 40 to modify a category code 310 or page level index 426 at the identified position. A conflict DELETE command instructs the filter unit 40 to delete a particular entry in the conflict data section 430 and gives the first hash value 301 to update the main hash array 410.

Referring again to FIG. 13, the update structure 500 is applied to the existing database 400a to produce the updated database 400b. To minimise downtime while the database structure 400 is being updated, the update structure 500 allows the database to be updated in small chunks as they are each copied from the existing structure 400a to the revised structure 400b, in particular due to the ordering of the commands. The main hash array 410 is recalculated during updating, to reference the new locations within the structure. Conveniently, comparing a checksum value of the new file 400b against a checksum given in the update header 510 confirms that the update has been performed correctly. Once the update is complete, the new file 400b is suitably written over the old file 400a.

In most cases, categorisation of URLs using the database structure may continue even during updating. However, in devices with limited memory, categorisation using the database structure is suitably halted completely for a short while, to allow the memory to be used for updating each of the chunks of the structure in turn.

The described database structure has many advantages, as discussed above or as will be appreciated by the skilled person by implementing the example embodiments of the invention.

In some of the exemplary embodiments, security of the database structure is improved by being difficult to reverse engineer. Compiling data into the database takes a high degree of skill and effort and it is desirable that the database should be relatively difficult to reverse engineer, whilst still being easy to use legitimately. By sorting only part of the URL hash 301, 302, it is impossible for an original URL 200 to be obtained from the stored data.

The database structure 400 discussed herein is relatively compact, which minimises storage space in temporary memory (e.g. RAM) or on a permanent storage medium (e.g. a hard disk). Further, the database structure provides a fast look-up, so that data relevant to a particular record can be quickly retrieved from the database. Further still, embodiments of the database structure discussed herein are readily updated, such as by providing an incremental daily update to keep the database current. Yet further, the example structure may be updated easily and whilst still live online.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A resource access filtering system, comprising:
one or more server devices, in combination, comprising:
a generator unit arranged to create a database structure, wherein the generator unit comprises
a categorization unit arranged to provide a plurality of resource identifiers each associated with a respective category code,
a hashing unit arranged to hash each of the plurality of resource identifiers to provide a hash value, and to divide the hash value into at least first and second hash portions, and
a storing unit arranged to output the database structure including at least a hash array and a main data section, wherein the main data section comprises the second hash portions and the respective category codes divided amongst a plurality of main data blocks, and the hash array comprises the first hash portions each associated with a pointer to a respective one of the main data blocks in the main data section; and a filter unit arranged to control access to a resource with reference to a category code obtained from the database structure according to a demanded resource identifier, wherein the filtering unit comprises
a communication unit arranged to obtain the demanded resource identifier in relation to a resource access request made by the client device,
a database access unit arranged to return a category code appropriate to the demanded resource identifier from the database structure, by generating a search hash value based on the resource identifier and dividing the search hash value into at least first and second hash portions, identifying a respective main data block in the main data section of the database structure by consulting the hash array using the first hash portion and retrieving the category code from the respective main data block according to the second hash portion, and
a control unit arranged to determine a control action in relation to the resource access request made by the client device with reference to the category code obtained by the database access unit,
wherein the hashing unit is arranged to divide each of the hash values into at least the first and second hash portions and a third hash portion, and the storing unit is arranged to discard each of the third hash portions; and
the database access unit is arranged to divide the search hash value derived from the demanded resource identifier into corresponding at least the first and second hash portions and a third hash portion.

2. The resource access filtering system of claim 1, wherein the storing unit is arranged to provide the hash array as an index comprising a set of hash index entries based on the first hash portions, wherein each of the hash index entries comprises the pointer identifying a respective one of the main data blocks in the main data section.

3. The resource access filtering system of claim 2, wherein each of the hash index entries further comprises a length value of the respective main data block in the main data section, whereby the pointer and the length value together select the respective main data block from the main data section.

4. The resource access filtering system of claim 1, wherein the main data section comprises a plurality of records, wherein each record comprises a respective one of the second hash portions and the associated category code for a given one of the plurality of resource identifiers.

5. The resource access filtering system of claim 4, wherein:
the storing unit is further arranged to provide a page data section and wherein each record in the main data section further comprises a page index which indexes a page data block in the page data section comprising one or more page data strings and one or more associated page category codes;
the communication unit is arranged to obtain the demanded resource identifier including a demanded page; and
the database access unit is arranged to receive the demanded page and to compare the demanded page against the page data strings in the respective page data block and return the associated page category code.

6. The resource access filtering system of claim 5, wherein at least one entry in the page index comprises a default value which indicates that there are no page data strings in the page data section for a particular one of the records.

7. The resource access filtering system of claim 1, wherein:
the storing unit is further arranged to provide a conflict data section comprising the category code and an undivided hash value of at least one of a first resource identifier and a second resource identifier for which the first and second hash portions thereof conflict, and wherein at least one of the records in the main data section for the first and second resource identifiers indicates that the conflict data section contains the undivided hash value; and the database access unit consults the conflict data section when the respective record in the main data section for the demanded resource identifier so indicates.

8. The resource access filtering system of claim 1, wherein:

the filter unit comprises at least a faster-access primary storage device and a slower-access secondary storage device; and in a first memory-based mode, the entire database structure is loaded into the faster-access primary storage device and is initialized by converting each of the pointers in the main hash array into memory location references which directly or indirectly reference memory address locations where the main data blocks of the main data section are loaded, and is accessed in the faster-access primary storage device; and in a second shared-access mode, the main hash array is loaded into the faster-access primary storage device, whilst at least the main data section is retained on the secondary storage device and is initialized by converting each of the pointers in the main hash array into offsets from a start of a file of the database structure as stored on the secondary storage, and is accessed by obtaining the converted offset from the main hash array in the primary storage device and loading only the required data block from the main data section into the primary storage device.

9. The resource access filtering system of claim 8, wherein the filter unit is selectively operated in either the first memory-based mode or in the second shared-access mode.

10. The resource access filtering system of claim 1, wherein:

the generator unit further comprises an updater unit arranged to produce an update structure; and the filter unit is arranged to apply the update structure to a current copy of the database structure to produce an updated new database structure incorporating a plurality of desired updates;

wherein the update structure comprises at least a main update section comprising a list of update commands each followed by one or more parameters to insert, modify or delete a respective record in the main data section and the update commands are sorted such that the order of the commands corresponds to the order of the records in the main data section.

11. The resource access filtering system of claim 10, wherein the update structure includes at least:

an INSERT command which instructs the filter unit to insert a new record in the main data section at a location identified by a position parameter giving an offset position where the instructed command is to be performed, and also provides parameters for the second hash portion and the category code of the new record and the first hash portion such that the main hash array is recalculated by the filter unit to allow for the new record;

a MODIFY command which instructs the filter unit to modify an existing record in the main data section wherein the parameters provide new data to be written into the database structure to replace the current data of the relevant record; and a DELETE command which instructs the filter unit to delete a record from the main data section of database structure at a location identified by a position parameter giving an offset position where the instructed command is to be performed, and a parameter comprising the respective first hash portion, such that the filter unit recalculates the main hash array to account for the now deleted record.

12. The resource access filtering system of claim 11, wherein the position parameter gives a relative position which is relative to a position of a previous command or, if no previous commands have been given, is relative to a default starting position.

13. The resource access filtering system of claim 10, wherein the storing unit is further arranged to provide a page data section, and the updater unit is arranged to provide the update structure including a page update section having a list of page update commands each followed by one or more page update parameters to insert, modify or delete a respective page string, and the page update commands are sorted by the first hash portion and then by the page string.

14. The resource access filtering system of claim 10, wherein the storing unit is further arranged to provide a conflict data section, and the updater unit is arranged to provide the update structure including a conflict update section having a list of conflict update commands each followed by one or more conflict update parameters to insert, modify or delete a respective undivided hash value, and the conflict update commands are sorted by the undivided hash values.

15. The resource access filtering system of claim 10, wherein the filter unit is arranged to update the database structure by copying a current live copy of the database structure in a plurality of chunks whilst applying the update commands separately in turn to each of the copied chunks to produce the updated new database structure.

16. The resource access filtering system of claim 1, wherein the resource identifiers identify resources in a computing network.

17. The resource access filtering system of claim 1, wherein the resource identifiers comprise Uniform Resource Locators.

18. The resource access filtering system of claim 1, wherein the resource identifiers comprise at least a host portion and the hash unit hashes the host portion to provide the hash value.

19. A filter apparatus to control access to resources in a computing system, comprising:

a processor configured to:

provide a plurality of resource identifiers, each associated with a respective category code;

hash each of the plurality of resource identifiers to provide a hash value, and to divide the hash value into at least first and second hash portions; and output the database structure to a memory, said output data structure including at least a hash array and a main data section, wherein the main data section comprises the second hash portions and the respective category codes divided amongst a plurality of main data blocks, and the hash array comprises the first hash portions each associated with a pointer to a respective one of the main data blocks in the main data section, control access by a client device to a resource with reference to a category code obtained from the database structure according to a demanded resource identifier; and obtain the category code appropriate to the demanded resource identifier from the database structure, by generating a search hash value based on the demanded resource identifier and dividing the search hash value into at least first and second hash portions, identifying a respective main data block in a main data section of the database structure by consulting the hash array using the first hash portion, and retrieving the category code from the respective main data block according to the second hash portion.

20. A computer implemented method of controlling access by a client device to a demanded resource identifier:

providing a plurality of resource identifiers each associated with a respective category code;

hashing each of the plurality of resource identifiers to provide a respective hash value and dividing the respective hash value into at least a first hash portion and a second hash portion; and storing at least a main hash array and a main data section in the database structure, wherein the main data section comprises a plurality of main data blocks each comprising a set of the second hash portions associated with the respective category codes, and the main hash array comprises the first hash portions each associated with a reference to a respective one of the plurality of main data blocks in the main data section, receiving the demanded resource identifier from the client device which identifies a resource in a computing system;

creating a hash value based on the resource identifier and dividing the hash value into at least first and second hash portions;

identifying a main data block in a main data section of the database structure by consulting a hash array using the first hash portion; and retrieving a category code from the identified main data block according to the second hash portion controlling access by the client device to the demanded resource identifier based, at least in part, on the category code.

21. The system of claim 1, further comprising:

a client computer, comprising: client unit arranged to request access to the resource with reference to the demanded resource identifier.

22. The apparatus of claim 19, wherein the hash array does not comprise the second hash portions.

23. The filter apparatus of claim 19, wherein the main data block is identified by consulting the hash array using only the first hash portion.

24. The method of claim 20, wherein the main hash array does not comprise the second hash portions.

25. The method of claim 20, wherein the main data block is identified without using the second hash portion.

* * * * *